(12) United States Patent
Hogenhout et al.

(10) Patent No.: US 7,711,561 B2
(45) Date of Patent: May 4, 2010

(54) SPEECH RECOGNITION SYSTEM AND TECHNIQUE

(75) Inventors: Wide Hogenhout, Cambridge (GB); Kean Kheong Chin, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 959 days.

(21) Appl. No.: 10/824,517

(22) Filed: Apr. 15, 2004

(65) Prior Publication Data

US 2005/0149326 A1    Jul. 7, 2005

(30) Foreign Application Priority Data

Jan. 5, 2004    (GB) ................................ 0400101.2

(51) Int. Cl.
*G10L 15/14* (2006.01)
(52) U.S. Cl. .................. 704/256.5; 704/242; 704/256.4
(58) Field of Classification Search ................. 704/231, 704/240, 241, 242, 256, 239, 270, 270.1, 704/275, 246, 256.7, 232, 235, 238, 256.5, 704/256.4
See application file for complete search history.

(56) References Cited

U.S. PATENT DOCUMENTS

| 5,857,169 | A  | * | 1/1999  | Seide ....................... 704/256.7 |
| 6,574,595 | B1 | * | 6/2003  | Mitchell et al. ............. 704/242 |
| 2002/0178004 | A1 | * | 11/2002 | Chang et al. ................ 704/246 |
| 2003/0061044 | A1 |   | 3/2003  | Miyazawa et al. |

OTHER PUBLICATIONS

S. Young, et al., HTK Book Version 3.2, pp. 56-66, Dec. 2002.

(Continued)

*Primary Examiner*—Huyen X. Vo
(74) *Attorney, Agent, or Firm*—Oblon, Spivak, McClelland, Maier & Neustadt, L.L.P.

(57) ABSTRACT

The present invention relates to speech recognition systems, particularly speech-to-text systems and software and decoders for the same. The present invention provides a decoder for an automatic speech recognition system for determining one or more candidate text unit concatenations according to a predetermined criterion and which correspond to a speech segment, the decoder comprising: means for receiving a sequence of feature vectors corresponding to the speech segment; means for mapping with different likelihood values the feature vectors to sequences of nodes in a decoding network, every sequence representing a concatenation of text units; means for determining one or more candidate node sequences in the decoding network corresponding to the candidate text unit concatenations by implementing a dynamic programming token passing algorithm in which each token corresponds to a node and is associated with a number of text unit concatenations and likelihood values for these concatenations, and wherein a token associated with a node in the decoding network is derived from the tokens associated with the previous nodes in the network; wherein tokens from different nodes that are to be passed to a common node are combined to generate a new token corresponding to the common node and associated with an identifier for text unit concatenations and likelihood values associated with the previous tokens of said different nodes. This is combined with means for merging a said token having a said identifier, the text unit concatenations of the said previous tokens being associated with said merged token dependent on their corresponding likelihood values.

25 Claims, 16 Drawing Sheets

OTHER PUBLICATIONS

Lawrence R. Rabiner, "A Tutorial on Hidden Markov Models and Selected Applications in Speech Recognition", Proceedings of the IEEE, vol. 77, No. 2, pp. 257-286, Feb. 1989.

J. J. Odell, et al., "A One Pass Decoder Design for Large Vocabulary Recognition", Proceedings of the DARPA Human Language Technology Workshop, pp. 380-385, Mar. 1995.

Chin-Hui Lee, et al., "A Frame-Synchronous Network Search Algorithm for Connected Word Recognition", IEEE Transactions on Acoustics. Speech, and Signal Processing, vol. 37, No. 11, pp. 1649-1658, Nov. 1989.

Arthur Nadas, "Estimation of Probabilities in the Language Model of the IBM Speech Recognition System", IEEE Transactions on Acoustics, Speech, and Signal Processing, vol. ASSP-32, No. 4, pp. 859-861, Aug. 1984.

X. Huang, et al., Spoken Language Processing—A Guide to Theory, Algorithm, and System Development, pp. 545-590, 2001.

S. J. Young, et al., "Token Passing: a Simple Conceptual Model for Connected Speech Recognition Systems", pp. 1-23, Jul. 31, 1989.

Jon Barker, et al., "Decoding Speech in the Presence of Other Sound Sources", 5 pages.

* cited by examiner

SPEECH RECOGNITION SYSTEM AND TECHNIQUE

FIELD OF THE INVENTION

The present invention relates to speech recognition systems, particularly speech-to-text systems and software and decoders for the same.

BACKGROUND OF THE INVENTION

Automatic Speech Recognition (ASR) systems are used in many applications to convert speech to text, for example digital dictation on a computer system or voice command recognition in embedded systems such as those provided in modern cars. Such systems take a digitised audio signal of an utterance, such as speech, as input and provides the text transcription of the audio signal as output. ASR is memory and processing power intensive, which is particularly problematic for embedded applications where limited use of resources and low cost are desirable.

The recognition is achieved by taking short samples of the speech, converting them to feature vectors that represent a speech segment, and mapping sequences of these vectors to possible sequences or concatenations of text units or words. The system associates a probability or likelihood to text unit sequences given a sequence of feature vectors, depending on how well they correspond to the feature vectors. The particular sequence of text units having the highest probability is prima facie the most likely textual transcription of the speech or feature vector sequence.

A typical application would be an on-board speech recognition system on a car. The effective resources available to the system may be limited to 1 megabyte RAM and 1 megabyte ROM memory and 100 MIPS cpu power. Typical input sentences could be "open the window" and "navigate to Baker Street". The actual footprint required differs strongly between a small command and control system (which perhaps only needs to recognise some 100 short phrases such as "start cd player") and a nagivation system (which may need to recognise thousands of streetnames).

Depending on the application, the set of all possible text unit sequences (sentences) can be small or very large. A language model represents a constraint on possible text unit sequences which make sense in the application. This is combined with a lexicon, which contains one or more pronunciations for every text unit. Using the language model and the lexicon a decoding network is constructed, such that a path through the network corresponds to a specific pronunciation of a specific text unit concatenation. An acoustic model is used to assign likelihood values to any path through the decoding network. These values depend on how closely the pronunciation implied in the path matches the observed feature vectors.

The decoding network represents the (often huge) number of paths in an efficient way by representing the paths as a network that connects nodes with arcs, possibly using techniques such as null nodes (that only serve to connect other nodes). A typical decoding network contains labels on arcs that represent text units, such that all paths together represent all valid sequences of text units in a particular language domain, for example the totality of valid commands in an in-car voice command recognition system. The nodes in such a network each represent one step in the chain of observations of feature vectors. This is usually associated with one or more states, but as noted above there are also null nodes which don't map to any state. A state is a multidimensional probability density function that enables calculating likelihoods of observations. One state can be associated to multiple nodes in one path, reflecting multiple occurrences of a sound, or in different paths, representing the same sound in different potential utterances.

A calculation is then performed to determine which path is the most likely, and in many applications this is taken as the textual transcription of the speech segment. In the above in-car command recognition system, this transcribed command is then input for a controller to, for example, open the window. This calculation is typically carried out using the Viterbi algorithm. Alternatively the Baum-Welch (or Forward-Backward) algorithm may be used. These algorithms can be formulated as Token Passing algorithms, as described in *Token Passing: a simple conceptual model for connected speech recognition systems*, by S. J. Young, N. H. Russell, J. H. S. Thornton, Cambridge University Engineering Department, Jul. 31, 1989.

These algorithms can be thought of as using tokens that are associated with a node in the decoding network and represent the best partial path from the start node up to that node. Each token is a (logical) data structure, is stored in memory, and is associated with a text unit or word history corresponding to the best partial path leading to that node. The tokens also comprise a likelihood "score" for the word history.

In many applications, the N-best word sequences are required, for example in case the user or speaker indicates that the best or highest likelihood sequence is incorrect, the next best or second highest likelihood sequence is offered as an alternative, and so on up to N. In the N-best case, not only the best but the N best paths up to every node have to be stored. The algorithms can handle this by extending a token such that it contains N word histories and associates a likelihood or score with every such word history. A further reason for maintaining the N best paths up to every node is the use of a statistical languguage model, which is a score based on the relative frequency of text unit sequences, which can be added to the likelihoods inside the token. In the specific case of using words as text units and considering the last three words, this is commonly known as a trigram language model. In that case it is still possible to provide alternative sequences to the application if required.

In these algorithms, a first token is created with an empty word history and is associated with the start node. After this, for every new feature vector, every token is copied to all nodes that it can reach though network arcs. There are also 'self-loop' arcs, which connect a node with itself, effectively making it possible for a token to remain at a node for some time. Every likelihood is updated with the likelihood of the feature vector given that state and also with a transition probability associated with the arc leading to the next node. When two or more tokens with equal word history meet, either the highest likelihood (Viterbi) or the combination is used (Baum-Welch). When two or more tokens with different word history meet, either the best one is chosen (1-best) or a selection from the various word histories is chosen that reflects the N best from the two tokens.

Processing through the network may halt after a predetermined end node is reached, and/or after a certain period, for example corresponding to the end of the speech segment. If successful, the token associated with the end node will contain a likelihood score corresponding to the or each sequence of nodes in the path(s) leading to the end node.

In a practical network containing perhaps thousands of nodes and far more possible paths, this has implications for memory space and cpu requirements. Various techniques are used to reduce the processing and/or the amount of memory resources utilised in the token passing process. For example pruning is used to delete tokens corresponding to very unlikely sequences so that further processing associated with that sequence can be halted in order to free up processing power and memory space.

Even with these existing techniques, ASR systems require significant processing power and memory resources, which is particularly problematic in smaller embedded applications such as in-car voice command recognition systems where there is a desire to minimise processor and/or memory resources.

SUMMARY OF THE INVENTION

In general terms in one aspect the present invention provides a multiple result decoder for an automatic speech recognition system which receives a sequence of feature vectors corresponding to a speech segment and outputs an approximation of the N most likely results, or the best result in a number of predefined categories, or the N most likely results in each of a number of predefined categories. The decoder utilises a network of nodes corresponding to probability density functions, the nodes being connected into paths corresponding to the valid sequences of textual units in the language domain of the system. The decoder maps the feature vector sequences to the node paths or sequences together with a likelihood value for each mapping, and calculates the N most likely sequences of text units by determining the N sequences of nodes that have the highest likelihood scores in each of a set of predefined categories. The calculation is performed using a token passing method in which a delayed merging mechanism is utilised. Instead of merging the word histories and associated likelihood values from two tokens into the new "intersection node" token, a pointer to or identifier for these word histories and associated likelihood values is associated with the new token.

This allows the merge operation (determining the word histories to associate with the new token) to be carried out later, for example when the network processing is halted, and thus avoids having to carry out merge operations associated with tokens which turn out later to be highly unlikely and so not amongst the N-best. Merging is required in other circumstances such as when the decoder decides that the token's word histories have to be extended with a word that was recognised or is about to be recognised.

When combined with pruning, this delayed merging technique substantially reduces computation as paths having low likelihoods may well be pruned prior to word recognition and hence any requirement for merging.

Once a token reaches the end node, the associated word histories can be retrieved from the data structure that stores the word histories.

This decoder arrangement therefore saves processing power, and can also save memory because there is no need to store the results of merge operations when they are delayed.

In particular in one aspect the present invention provides a decoder for an automatic speech recognition system for determining one or more candidate text unit concatenations according to a predetermined criterion and which correspond to a speech segment, the decoder comprising: means for receiving a sequence of feature vectors corresponding to the speech segment; means for mapping with different likelihood values the feature vectors to sequences of nodes in a decoding network, every sequence representing a concatenation of text units; means for determining one or more candidate node sequences in the decoding network corresponding to the candidate text unit concatenations by implementing a dynamic programming token passing algorithm in which each token corresponds to a node and is associated with a number of text unit concatenations and likelihood values for these concatenations, and wherein a token associated with a node in the decoding network is derived from the tokens associated with the previous nodes in the network; wherein tokens from different nodes that are to be passed to a common node are combined to generate a new token corresponding to the common node and associated with an identifier for text unit concatenations and likelihood values associated with the previous tokens of said different nodes.

This decoder arrangement allows some mergers to be delayed by providing an identifier to text unit concatenations and their likelihood values in other previous nodes/tokens.

The plurality of candidate text unit concatenations can be the text unit concatenations with the N-best likelihood values, and/or those with the best likelihood values in a plurality of categories; for example at particular noise levels.

Where categorisation is employed, the tokens are preferably associated with a number of category markers each corresponding to a said text unit concatenation, each category marker being associated with one of said categories.

Preferably the mapping means comprises an acoustic model and a language model. Preferably the acoustic model is a Hidden Markov Model.

Preferably the dynamic programming token passing algorithm is a Viterbi algorithm, although it may alternatively be a Baum-Welch algorithm for example.

Preferably the decoder further comprises means for pruning tokens having likelihood values below a prune threshold. This reduces the processing necessary as some tokens are pruned prior to needing merging.

Preferably the tokens and the text unit concatenations are stored in logically separate memories, and wherein a logically separate list data-structure is used to associate tokens with their text unit concatenations or identifiers and corresponding likelihood values. However other memory architectures are possible.

The means for merging a said token having a said identifier comprises means for associating the token with the text unit concatenations of the said previous nodes dependent on their corresponding likelihood values.

In one embodiment the merging is carried out if the token has a likelihood value above a merge threshold.

The decoder is preferably implemented in an automatic speech recognition system, for example a voice activated control or navigation system for in car use.

In another aspect there is provided a decoder for determining a plurality of candidate text unit concatenations corresponding to a speech segment according to a predetermined criterion in an automatic speech recognition system, the decoder comprising: means for receiving a sequence of feature vectors corresponding to the speech segment; means for mapping with different likelihood values the feature vectors to sequences of nodes in a decoding network, every sequence representing a concatenation of text units; means for determining a plurality of candidate node sequences in the decoding network corresponding to the plurality of candidate text unit concatenations by implementing a dynamic programming token passing algorithm in which each token corresponds to a respective node and is associated with a number of text unit concatenations and likelihood value for these concatenations, and wherein a token associated with a node in a node sequence is derived from the token associated with the previous node in the sequence; wherein tokens from different node sequences that are to be passed to a common node are combined to generate a new token corresponding to the common node and associated with an identifier for text unit concatenations and likelihood values associated with those text unit concatenations.

In another aspect there is provided a decoder for determining one or more candidate text unit concatenations corresponding to a speech segment according to a predetermined criterion in an automatic speech recognition system, the decoder comprising: means for receiving a sequence of feature vectors corresponding to the speech segment; means for mapping with different likelihood values the feature vectors to sequences of nodes in a decoding network, using an acoustic model based on Hidden Markov Models, every sequence representing a concatenation of text units; means for determining one or more candidate node sequences in the decoding network corresponding to the candidate text unit concatenations by implementing a dynamic programming token passing algorithm in which each token corresponds to a node and is associated with a number of text unit concatenations and likelihood values for these concatenations, and wherein a token associated with a node in the decoding network is derived from the tokens associated with the previous nodes in the network; wherein tokens from different nodes that are to be passed to a common node are merged to generate a new token corresponding to the common node and associated with text unit concatenations and likelihood values that are based on the text unit concatenations and likelihood values of previous tokens; means for delaying said merge operation by creating a temporary structure that holds instructions that are sufficient to carry out the merge operation at a later time; means for pruning tokens having likelihood values below a pruning threshold.

In particular in another aspect there is provided a method of decoding for determining a plurality of candidate text unit concatenations corresponding to a speech segment according to a predetermined criterion in an automatic speech recognition system, the method comprising: receiving a sequence of feature vectors corresponding to the speech segment; mapping with different likelihood values the feature vectors to sequences of nodes in a decoding network, every sequence representing a concatenation of text units; determining a plurality of candidate node sequences in the decoding network corresponding to the plurality of candidate text unit concatenations by implementing a dynamic programming token passing algorithm in which each token corresponds to a respective node and is associated with a number of text unit concatenations and likelihood values for these concatenations, and wherein a token associated with a node in a node sequence is derived from the token associated with the previous node in the sequence; wherein tokens from different node sequences that are to be passed to a common node are combined to generate a new token corresponding to the common node and associated with an identifier for text unit concatenations and likelihood values associated with those text unit concatenations.

There are also provided methods corresponding to the above preferred apparatus features.

There is also provided a computer program having processor code for carrying out these methods. This is preferably provided on a carrier medium for example a storage medium such as a CD ROM or a transient medium such as a signal.

BRIEF DESCRIPTION OF THE DRAWINGS

Embodiments are described with reference to the following drawings, by way of example only and without intending to be limiting, in which.

DETAILED DESCRIPTION

Figure 1:
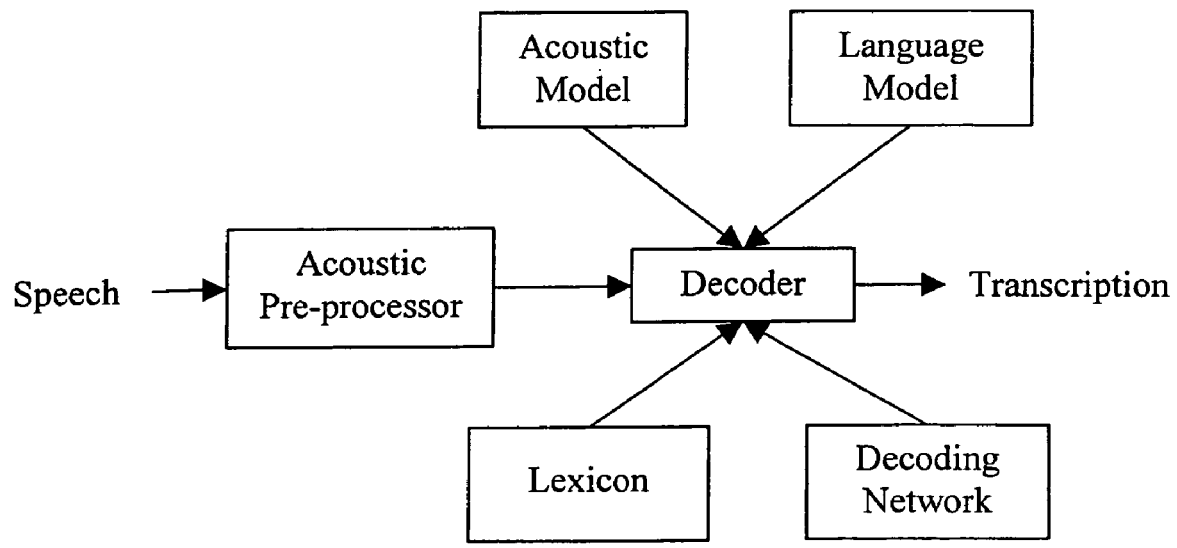
FIG. 1 illustrates a basic structure of an Automatic Speech Recognition system.

The described embodiments are utilised in an Automatic Speech Recognition (ASR) system that takes the digitised audio signal of an utterance as input and provides the text transcription of the audio signal as output. FIG. 1 shows the basic structure of such an ASR system. Generally an ASR system has 6 major components. These are: Referring to the parts of FIG. 1 in more detail, the digitised audio signal of an utterance is received by the Acoustic Pre-processor, where it is converted to a sequence of feature vectors. Each feature vector represents a short segment of speech. A preferred conversion technique is described in more detail in "HTK Book version 3.2" by S. Young, G. Evermann et al, Cambridge University Engineering Department, December 2002.

Given the sequence of feature vectors from the Acoustic Pre-processor, the decoder attempts to find the "best" text transcription using the other components of the ASR system, being a decoding network, an Acoustic Model, a Language Model and Lexicon. This is explained in detail in the following three documents which are incorporated by reference. L.

R. Rabiner, "A Tutorial on Hidden Markov Models and Selected Applications in Speech Recognition", in Proceedings of the IEEE, 77(2): 257-286, 1989. S. J. Young, N. H. Russell and J. H. S. Thornton, "Token Passing: A Simple Conceptual Model for Connected Speech Recognition Systems", Cambridge University Engineering Department Technical Report CUED/F_INFENG/TR.38, Cambridge University, 1989. J. J. Odell, V. Valtchev, P. C. Woodland and S. J. Young, "A One-Pass Decoder Design for Large Vocabulary Recognition", in Proceedings of the DARPA Human Language Technology Workshop, pp. 405-410, March 1995.

The decoding network represents the set of possible sentences in the current language domain, and is discussed in more detail in "A Frame-Synchronous Network Search Algorithm for Connected Word Recognition", by C. H. Lee and L. R. Rabiner, IEEE Transactions on Acoustics, Speech, and Signal Processing, vol. ASSP-37, no. 11, November 1989.

The Acoustic Model (AM) is a mathematical model of a speech unit, for example word, phone or syllable. The preferred model unit is the phone model, and the preferred acoustic model is the Hidden Markov Model (HMM).

The Language Model (LM) represents the constraint on possible word sequences in a particular language or domain. It tries to capture the syntactic and semantic structure of sentences in the current language domain. A preferred language model is described in more detail in "Estimation of probabilities in the language model of the IBM speech recognition system", by N. Arthur, IEEE Transactions on Acoustics, Speech and Signal Processing, ASSP-32(4): 859-861, August 1984.

If a sub-word Acoustic Model is used then a dictionary is required to provide the correct model sequence that represents any word in the current language domain. For phone unit Acoustic Model, the lexicon will be a pronunciation dictionary, which provides the phonetic transcription for each word.

The decoding problem is to find the best text transcription given the utterance (in the form of a sequence of feature vectors), using information provided by the AM, LM and the grammar of a language domain. This can be formulated as:

$$\hat{W} = \underset{W \in \tilde{W}}{\operatorname{argmax}} P(W \mid O) \quad \text{(Equation 1)}$$

$$= \underset{W \in \tilde{W}}{\operatorname{argmax}} \frac{P(O \mid W) P(W)}{P(O)}$$

W represents a sequence of word $W_1 \ldots W_N$ and $\hat{W}$ that is the best text transcription for the utterance O (which is a sequence of features vector, $O_1 \ldots O_T$), selected from $\tilde{W}$ the set of all possible word sequences in the current language domain.

$$P(W) \approx P(W_1) P(W_2 \mid W_1) P(W_3 \mid W_2) \ldots P(W_N \mid W_{N-1}) \quad \text{(Equation 2a)}$$

P(W) is the probability of the given word sequence W in the current language domain and it is given by the language model. If a bi-gram Language Model is used, P(W) can be expressed as Equation 2a. P(O) is normally ignored since it is constant across all possible word sequences. The value of P(O|W) is provided by the acoustic model. If H is the model sequence $H_1 \ldots H_M$ that represents the word sequence W, we have:

$$P(O \mid W) = P(O \mid H) \quad \text{(Equation 2b)}$$

As mentioned above, the preferred Acoustic Model is the Hidden Markov Model (HMM). In this case, H is a sequence of HMMs, $H_1 \ldots H_M$. If word models are used, then M=N, one model for each corresponding word. Phone models are the most commonly used type of models. If phone models are used then generally, M>N, since the phonetic transcription of a word normally contains more than one phone. HMMs consist of a collection of states that are connected by directed arcs, as shown in FIG. 2.

Figure 2:
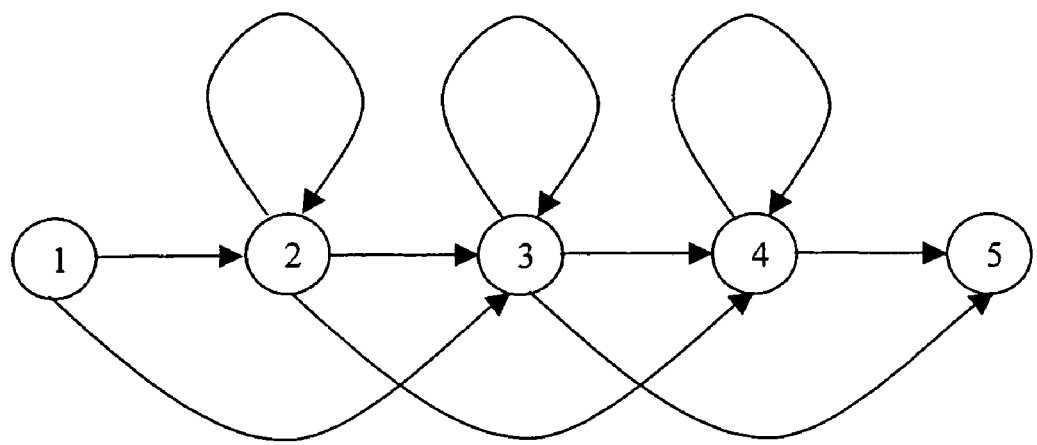
FIG. 2 illustrates a basic HMM as a collection of states.

FIG. 2 shows five states, numbered 1 to 5, which are interconnected by arcs. These states correspond to one or more speech units or phonemes. State 1 is the first state, and has outgoing links to states 2 and 3, state 3 has outgoing links to itself and states 3 and 4, state 3 has links to itself and states 4 and 5 and finally state 4 has links to itself and state 5, which is the last state. The alternative movements between states accommodates different accents and speech speeds, so that for example where a particular phoneme is pronounced slowly or drawn out, a state may repeat using the link back to itself.

Normally the first and the last state are non-emitting states or null states. As the name implies these are states that will not emit any feature vectors. Null states serve as the connection point between HMMs in a HMM network. Using null states will reduce the number of arcs between HMMs. In the following description, these null states are ignored for simplicity without lost of generalisation, since they do not affect the result of the decoding process.

$$P(O \mid H) = \sum_{\tau} \prod_{m=1}^{M} P(O^m \mid H_m) \quad \text{(Equation 3)}$$

$$= \sum_{\tau} \prod_{m=1}^{M} P(O_{\tau_{m-1}+1}, \ldots, O_{\tau_m} \mid H_m)$$

$$= \sum_{\tau} \prod_{m=1}^{M} \sum_{s^m} P(O_{\tau_{m-1}+1}, \ldots, O_{\tau_m}, s^m \mid H_m)$$

$$= \sum_{\tau} \prod_{m=1}^{M} \sum_{s^m} \prod_{t=\tau_{m-1}+1}^{\tau_m} A_{s_{t-1}, s_t} b_{s_t}(O_t)$$

$\tau = \tau_1, \ldots, \tau_M$ is one possible time alignment of speech segments for model sequence H such that $O = O^1, \ldots, O^M$ and $O^m = O_{\tau_{m-1}+1}, \ldots, O_{\tau_m}$. $s^m s_{\tau_{m-1}+1}, \ldots s_{\tau_m}$ is one possible state sequence for model $H_m$. The state id, $s_t = \{i, m\}$ indicates both the model id m and the state number i. $A_{i,j}$ is the transition probability from state i to state j. $b_j(O_t)$ is the probability of state j emitting the feature vector $O_t$. $P(O^m, s^m \mid H_m)$ is defined in Equation 4:

$$P(O^m, s^m \mid H_m) = P(O_{\tau_{m-1}+1}, \ldots, \quad \text{(Equation 4)}$$

$$O_{\tau_m}, s_{\tau_{m-1}+1}, \ldots, s_{\tau_m} \mid H_m)$$

$$= \prod_{t=\tau_{m-1}+1}^{\tau_m} P(O_t, s_t \mid O_{\tau_{m-1}+1}, \ldots,$$

$$O_{t-1}, s_{\tau_{m-1}+1}, \ldots, s_{t-1}, H_m)$$

$$= \prod_{t=\tau_{m-1}+1}^{\tau_m} P(O_t \mid O_{\tau_{m-1}+1}, \ldots,$$

$$O_{t-1}, s_{\tau_{m-1}+1}, \ldots, s_t, H_m)$$

$$P(s_t \mid O_{\tau_{m-1}+1}, \ldots,$$

$$O_{t-1}, s_{\tau_{m-1}+1}, \ldots, s_{t-1}, H_m)$$

-continued $$= \prod_{t=\tau_{m-1}+1}^{\tau_m} P(O_t \mid s_t, H_m)$$

$$P(s_t \mid s_{t-1}, H_m)$$

$$= \prod_{t=\tau_{m-1}+1}^{\tau_m} A_{s_{t-1},s_t} b_{s_t}(O_t)$$

Note that the following identities are employed to simplify Equation 4:

$$P(O_{\tau_{m-1}+1}, s_{\tau_{m-1}+1} \mid H_m) = P(O_{\tau_{m-1}+1}, s_{\tau_{m-1}+1} \mid O_{\tau_{m-1}}, O_{\tau_{m-1}}, s_{\tau_{m-1}}, s_{\tau_{m-1}}, H_m)$$

$$P(O_{\tau_{m-1}+2}, s_{\tau_{m-1}+2} \mid O_{\tau_{m-1}+1}, s_{\tau_{m-1}+1}, H_m) = P(O_{\tau_{m-1}+2}, s_{\tau_{m-1}+2} \mid O_{\tau_{m-1}+1}, O_{\tau_{m-1}+1}, s_{\tau_{m-1}+1}, s_{\tau_{m-1}+1}, H_m)$$

Also, the hidden markov model makes the following assumptions:
 The probability of the model emitting a particular feature vector is not dependent on previously emitted feature vectors or previous hidden states. It only depends on the current hidden state.
 The probability of being in a particular hidden state is only dependent on the previous hidden state.

Hence the following identities are employed in Equation 4:

$$P(O_t \mid s_t, H_m) = P(O_t \mid O_{\tau_{m-1}+1}, \ldots, O_{t-1}, s_{\tau_{m-1}+1}, \ldots, s_t, H_m)$$

$$P(s_t \mid s_{t-1}, H_m) = P(s_t \mid O_{\tau_{m-1}+1}, \ldots, O_{t-1}, s_{\tau_{m-1}+1}, \ldots, s_{t-1}, H_m)$$

Normally viterbi decoding is used, in which case only the time alignment and state sequence that give the highest likelihood is considered. For viterbi decoding, P(O|H) in Equation 3 is revised to Equation 5a:

$$P(O \mid H) = \max_\tau \prod_{m=1}^M P(O_{\tau_{m-1}+1}, \ldots, O_{\tau_m} \mid H_m) \quad \text{(Equation 5a)}$$

$$= \max_\tau \prod_{m=1}^M \max_{s^m} P(O_{\tau_{m-1}+1}, \ldots, O_{\tau_m}, s^m \mid H_m)$$

$$= \max_\tau \prod_{m=1}^M \max_{s^m} \prod_{t=\tau_{m-1}+1}^{\tau_m} A_{s_{t-1},s_t} b_{s_t}(O_t)$$

$$= \max_s \prod_{t=1}^T A_{s_{t-1},s_t} b_{s_t}(O_t)$$

$s=s^1, \ldots, s^M$ is one possible state sequence for the whole utterance. Computing Equation 5a is essentially a dynamic programming problem and the computationally efficient viterbi algorithm is normally used.

Redefining Equation 5a as:

$$P(O \mid H) = \Phi_{FINAL(H)}(T) \quad \text{(Equation 5b)}$$

T is the total number of frame for utterance O. It follows that P(O|H) can be computed recursively using the following definition:

$$\Phi_j(t) = \max_{i \in PREV(j)} (A_{ij} \Phi_i(t-1) b_j(O_t)) \quad \text{(Equation 5c)}$$

FINAL(H) and PREV(j) is the final state for model sequence H and the set of states which has an arc to state j respectively.

Figure 3:
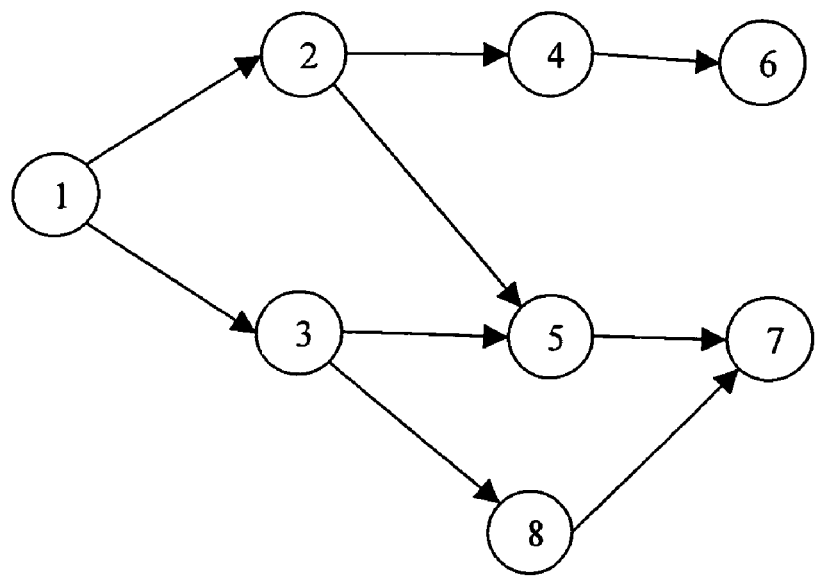
FIG. 3 illustrates an example of an HMM state network for decoding.

Ŵ, the set of all possible word sequences in the current domain, can be represented by a HMM state network. Part of such a network is shown in FIG. 3, the "internal" arcs of FIG. 2 having been removed for clarity. Normally the recognition language domain is specified using a word network (representing all possible word sequences). The word level network is expanded to model network, using the phonetic transcription in a lexicon. The model level network can be further expanded to a state level network. For such state network, the correct transcription W for a given utterance O is:

$$W = \underset{W'}{\operatorname{argmax}} P(O \mid W') \quad \text{(Equation 5d)}$$

$$= \underset{W'}{\operatorname{argmax}} P(O \mid H) \Big|_{H \in W'}$$

$$= \underset{W'}{\operatorname{argmax}} \Phi_{FINAL(H)}(T) \Big|_{H \in W'}$$

Note that $\Phi_{i \in START}(0)=1$, $\Phi_{i \in START}(t)=0$ $\forall t \neq 0$ and $\Phi_i(0)=0$ $\forall i \notin START$, where START is the set of initial states and FINAL(H) is the set of last states for model sequence H. The set of all final states in a state network correspond to all the possible word sequences represented by that particular state network. Each final state might be associated with more than one valid word sequence. For example, in FIG. 3, state 7 is a final state and state 1 is the first state. There are three valid paths through the state network that end at state 7. These paths trace through the states network via the state sequence 1257, 1357 and 1387 respectively. State 6 is another final state in this state network. There is only one path that ends at state 6, being the state sequence 1246.

The decoding network processing is preferably performed utilising the Viterbi algorithm, although any dynamic programming algorithm could alternatively be used, for example Baum-Welch.

The dynamic programming algorithm is preferably implemented by the token passing algorithm, preferably as described in S. J. Young, N. H. Russell and J. H. S. Thornton, "Token Passing: A Simple Conceptual Model for Connected Speech Recognition Systems", Cambridge University Engineering Department Technical Report CUED/F_INFENG/TR.38, Cambridge University, 1989.

Figure 4:
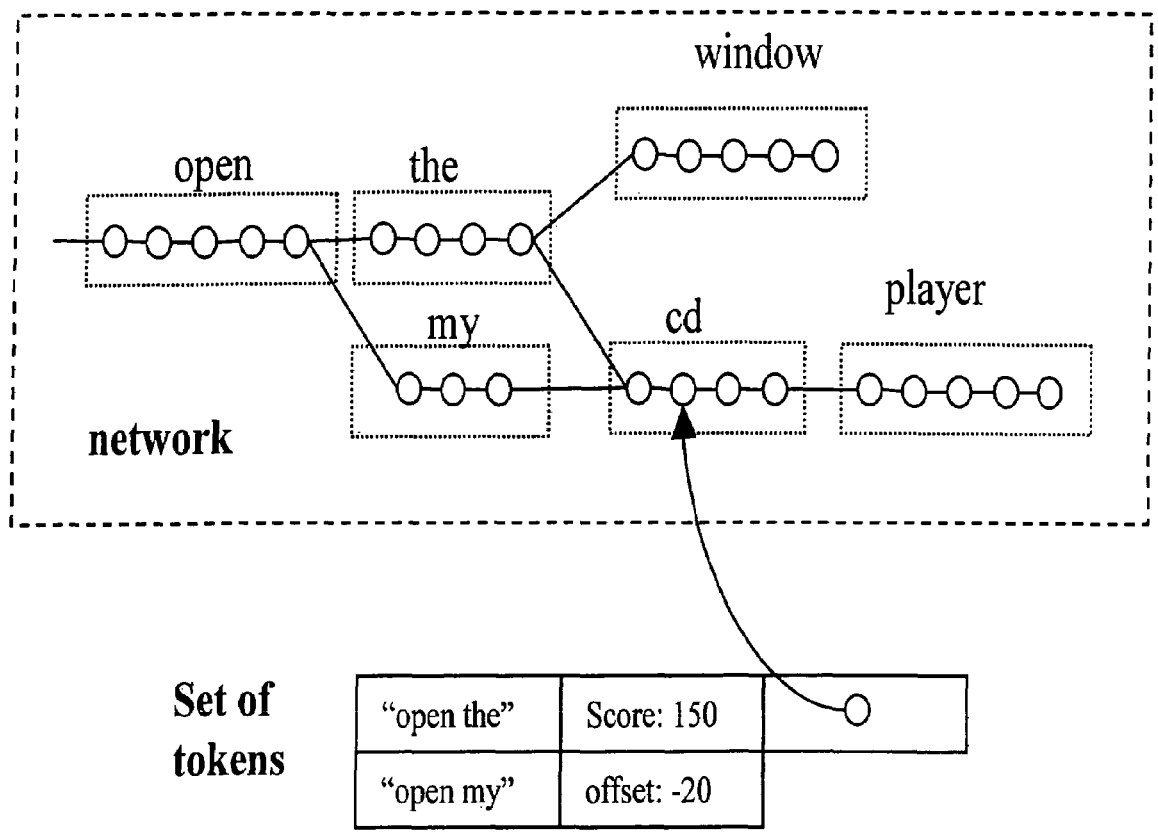
FIG. 4 illustrates a token associated with a node of a decoding network.

A token is associated to each node in the network as shown in FIG. 4. A token is an abstract or logical data structure that contains the likelihood (score) for the state it is associated with and also the concatenation of text units (word history) for that state or node. Normally log likelihood is stored, since it is computationally cheaper to compute:

$$\log(\Phi_j(t)) = \max_{i \in PREV(j)} (\log(A_{ij}) + \log(\Phi_i(t-1)) + \log(b_j(O_t))) \quad \text{(Equation 6)}$$

At time t the token for state j holds the value of $\log(\Phi_j(t))$. For each new speech frame, all the tokens in the decoding network are updated using Equation 6. Note that $\log(\Phi_i(t-1))$ is the log likelihood in token for state i at time t−1. The token from state i is propagated to state j and updated with the log transition probability $\log(A_{i,j})$ and the log of the probability of state j emitting the current feature vector $\log(b_j(O_t))$, hence the name token passing algorithm.

At time T, the token with the best log likelihood from the set of tokens associated with all the final states, represents the state sequence that correspond to the "correct" transcription. Since a final state can be associated with more than one state sequence, some form of trace back information should be recorded to allow the recovery of the state sequence that produced the best token. Normally only word sequences are required as transcription, so the trace back information is only recorded at word boundaries.

According to Equation 6, only the token from the state that gives the highest value for $\log(A_{ij})+\log(\Phi_i(t-1))$ is chosen to be updated to become the new token for a state with more than one previous state.

Figure 5:
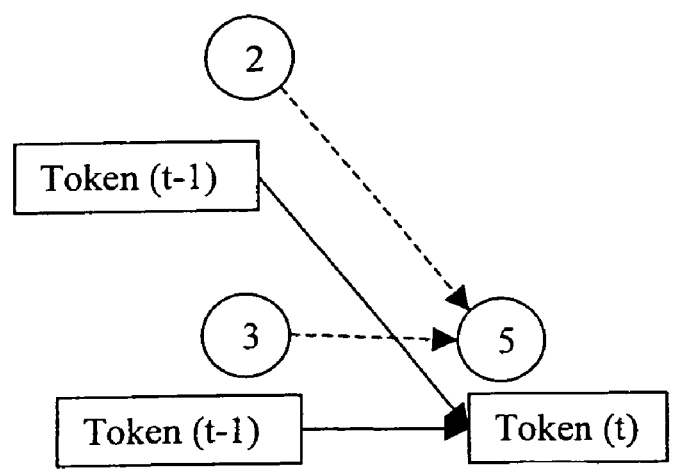
FIG. 5 illustrates a token passing method.

FIG. 5 illustrates an example of token propagation or passing. In this example, state 5 receives a token from previous states 2 and 3, respectively. Only one of the tokens from states 2 and 3 is chosen to be updated (Viterbi), and become the new token in state 5. The information on the token that is not chosen will be lost.

Each token represents a particular hypothesis of the best transcription. When more than one token meet at the same state, only the hypothesis with the best log likelihood is chosen in Viterbi decoding. All other hypotheses are discarded.

In arrangements where the N-best transcriptions are required, N hypotheses are retained in the token. This is called N-Best decoding and it is described in detail in "Spoken Language Processing—A Guide to Theory, Algorithm, and System Development" by X. Huang, A. Acero, and H. W. Hon., Prentice Hall, Upper Saddle River, N.J., USA, ISBN: 0-13-022616-5,2001. In this type of decoding, the word history information from N-best previous tokens must be preserved since each of these tokens from the previous states might record a different word history. Retaining the N-best alternate word history will allow the ASR system to generate a word graph or a word lattice that represents the N-best transcription for the given utterance.

In this case, the new token is no longer just an updated version of the token that gives the best log likelihood. Ideally tokens from all the previous states in a sequence are combined together to form a new token in such a way that it retains all the information from N previous tokens. The process of producing the new token with word histories and scores from N previous tokens is called token merging.

Figure 7:
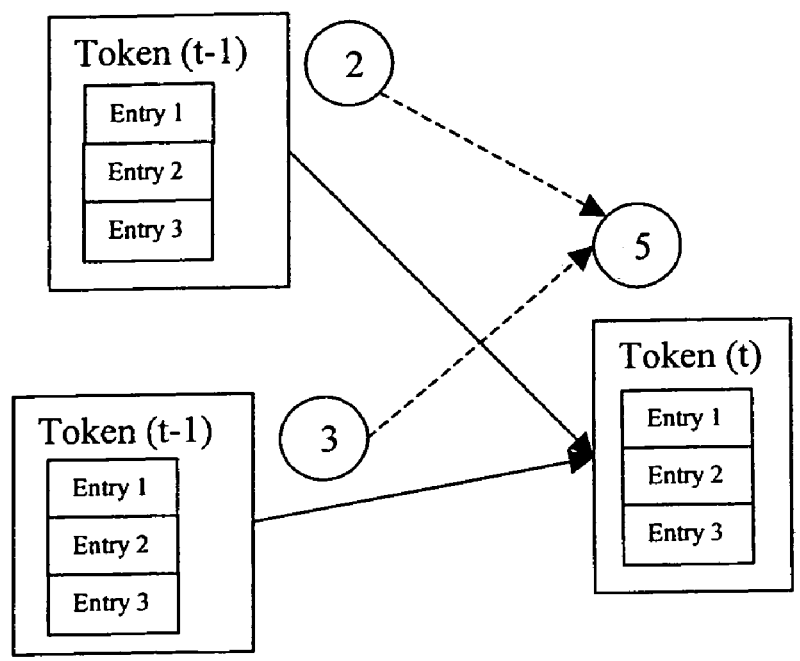
FIG. 7 illustrates a token merging procedure.

To support this type of merging, the token structure is revised to contain a list. Each entry in the list will record relevant information from one previous token. When tokens are merged, the lists from these tokens are merged into a new list for the new token, such as is shown in FIG. 7. More specifically, in the FIG. 7 example, state 5 receives tokens from previous states 2 and 3. Each of the states 2 and 3 have tokens with lists having three entries. The log likelihood in the new token for state 5 is taken from the best previous token (after applying the transitional probability) and updated following Equation 6 as before.

Normally the entries of the lists are sorted by descending order of log likelihood and the lists are finite in size, so only the N best entries are retained. For example in FIG. 7, the tokens all contain a maximum of 3 entries in the list. When tokens from state 2 and state 3 are merged, the two lists are merged and sorted to create a new list, but only the top three entries of the new list are retained in the new token for state 5.

The merging of all the sorted lists to create a new, sorted list is a computationally expensive operation, especially if the number of entries in the list is large. This is because the scores (or offsets) of all the word history entries must be compared in order to determine which entries to retain in the new token, and the offsets need to be recalculated. This extra cost will result in a significant increase in the total computation cost for P(O|H), since this type of token merging is carried out for every state in the decoding network at every speech frame.

Figure 6:
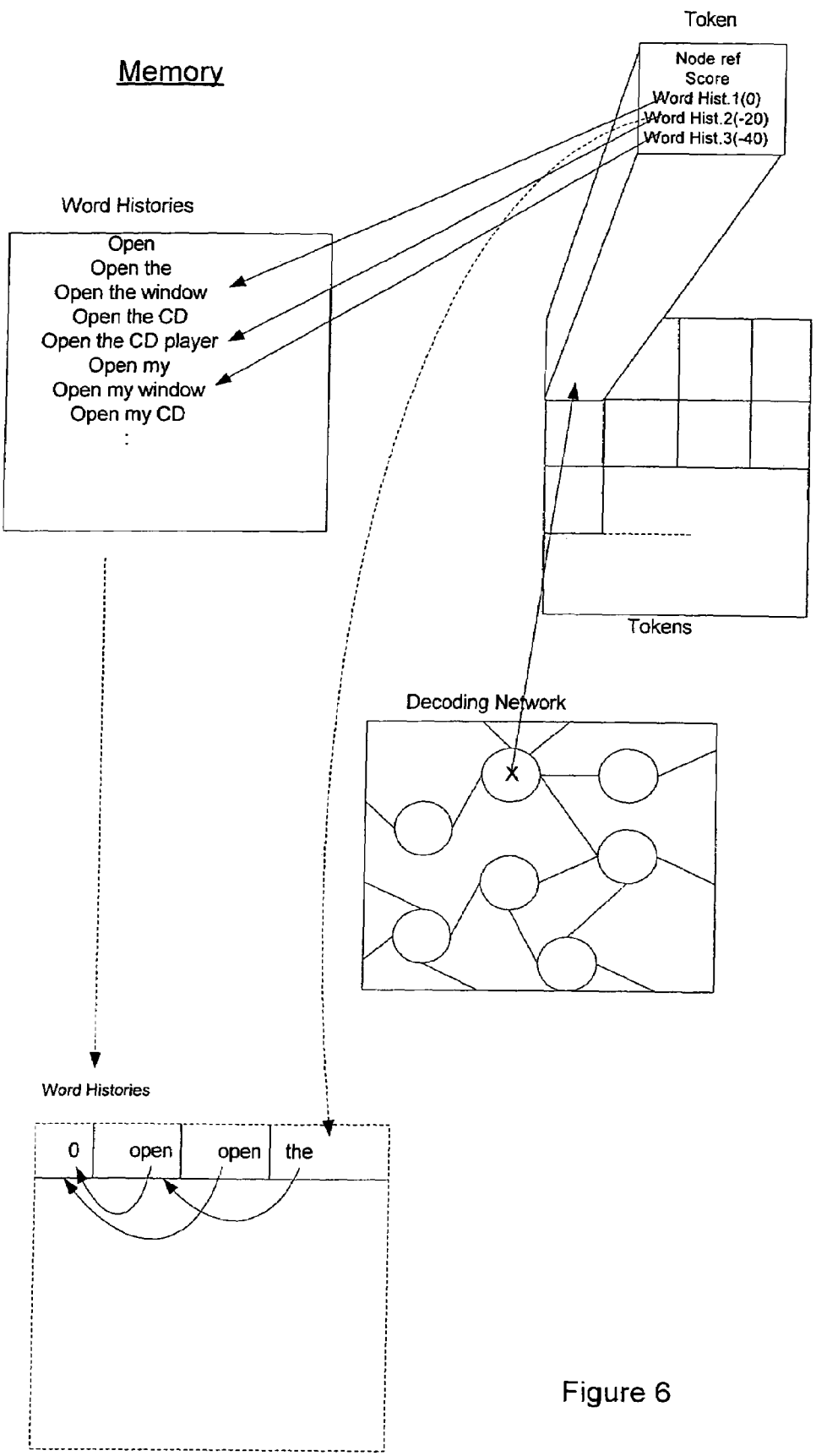
FIG. 6 illustrates a memory architecture for storing the data structures of the ASR.

The data associated with a token can be stored in memory in numerous ways, for example as shown in FIG. 6. The token is an abstract data structure in the sense that its contents or data can be distributed. As shown node X has an associated token which comprises a score or likelihood value and a plurality of word histories. The score or likelihood is associated with the highest scoring word history (shown at the top of the list). All word histories have a score or log likelihood expressed as a difference with the top word history, which is consequently zero for the top word history itself. Different word histories arise as a consequence of different paths leading through this node. A token is "passed" from one node to another by copying and updating the likelihood with appropriate emission and transition likelihoods. When multiple tokens need to be copied into one node, they have to be merged. Tokens having a low score are typically pruned or destroyed in order to save on memory space and CPU.

For computational efficiency the word histories ("Open", "Open the" . . . ) associated with the tokens are typically stored in a separate word history data structure and the tokens store word histories through a pointer or index into this structure (Word hist. 1, Word hist. 2, . . . ). In the example shown, the Word Hist. 1 pointer or index in the token points to "Open the Window" in the Word History Data structure. This allows common word histories to be shared by the tokens rather than duplicated. Similarly the word histories themselves can be further sub-divided into words and pointers to earlier words in a sequence as shown in the word history data structure in the dashed outline. This avoids duplication and hence saves memory space.

Various other memory configurations for maintaining the token data of text unit concatenations and associated likelihood scores will be readily implementable by those skilled in the art.

Some of the tokens in the decoding system might have very low log likelihood compared to other tokens in the system. This means that the hypothesis represented by that token is very unlikely at that point in time. At every time frame all the tokens in the system are updated including those tokens with very low log likelihoods. It is possible that some of those tokens with very low log likelihood at this time will become more likely at a later time frame. However, this is normally very unlikely, and the computational cost used to update those unlikely tokens is then wasted. Significant amount of saving on computation time can be achieved if unlikely hypotheses are identified and discarded as early as possible.

Therefore beam pruning is preferably used, and is described in more detail in "A One-Pass Decoder Design for Large Vocabulary Recognition", J. J. Odell, V. Valtchev, P. C. Woodland and S. J. Young, in Proceedings of the DARPA Human Language Technology Workshop, pp. 405-410, March 1995.

Figure 8:
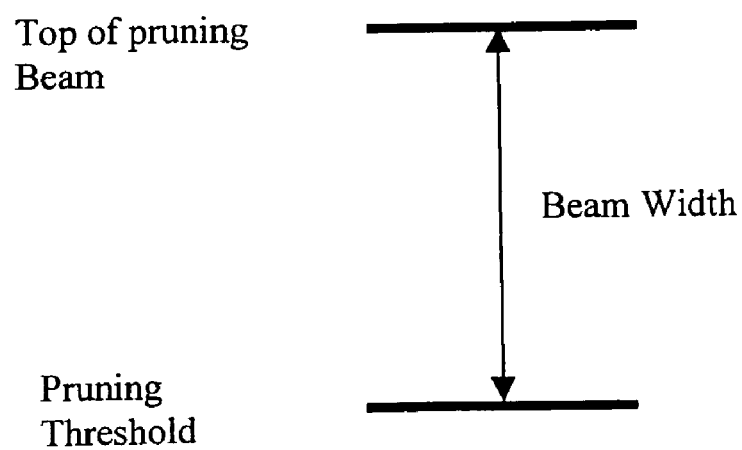
FIG. 8 illustrates a pruning beam threshold.

In beam pruning, after updating all the tokens for one time frame, the token with the best log likelihood is selected from all the existing tokens in the system. The best log likelihood is the top of the pruning beam for this time frame. The pruning threshold can be determined by subtracting the beam width from the top of the beam, as shown in FIG. 8.

All the tokens in the system will be checked and any token with a log likelihood below the pruning threshold will be considered unworthy of further computation. These tokens will therefore be destroyed to reduce the total computational cost of decoding. To destroy a token, it is replaced with a null token. A null token is a token with an empty list and no word history and the log likelihood of the token is a large negative number that approximates log(0).

It is important to select a suitable beam width. A tight beam width will results in maximum computational cost saving while having a very high risk of discarding the correct hypothesis.

There are many methods for pruning described in the literature, and while the method described here is the most common, many others can also be used in combination with the invention. The resulting savings can vary depending on the pruning method.

The pruning threshold can also be estimated before the creation of any token in a new time frame. Usually information from the previous time frame is used, since the best log likelihood normally changes very slowly. If this is the case, before creating a new token, the log likelihood should be estimated and the token will only be created if the new log likelihood is above the estimated pruning threshold. Efficiency is improved since no unnecessary token creation is carried out.

Figure 9:
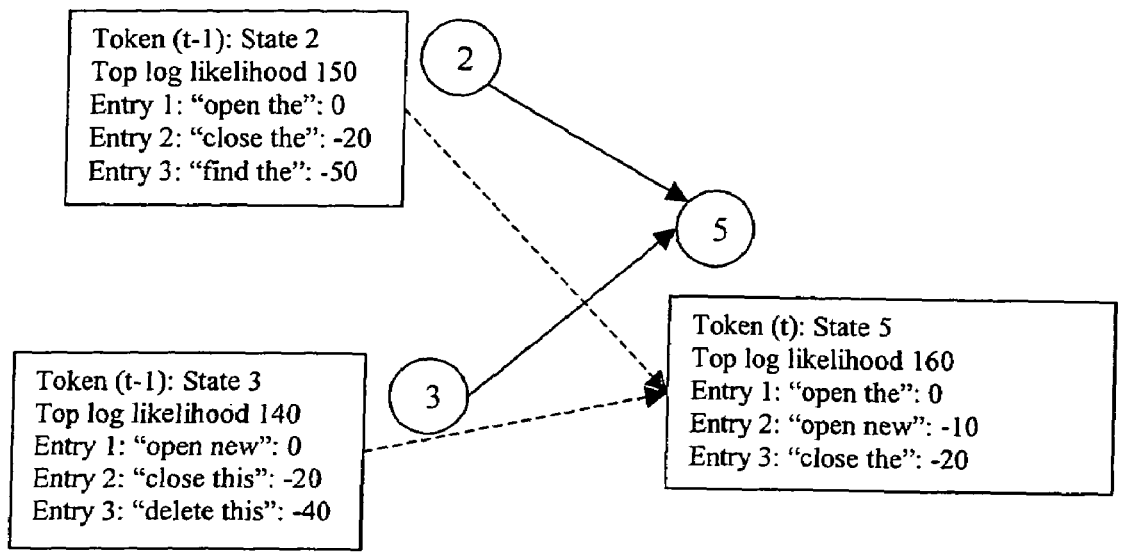
FIG. 9 further illustrates the token merging procedure of FIG. 7.

Returning to the merging operation in more detail, FIG. 9 shows how two tokens each containing multiple word histories are merged into one new token in a state network according to a known technique. One token is at state 2 at time t−1 and has three entries: "open the" (log likelihood 150), "close the" (log likelihood 130) and "find the" (log likelihood 100). These log likelihoods are usually stored as relative differences to the best log likelihood. This is shown in FIG. 9, where, in the token at state 2, there is an item for the "Top log likelihood" having a value "150", and then the three entries "open the, "close the" and "find the" have the values of "0", "−20" and "−50" respectively. The "Top log likelihood" is a value indicative of the most likely path through the state model of a speech signal.

A second token is at state 3 at time t−1 and also has three entries: "open new" (log likelihood 140), "close this" (log likelihood 120) and "delete this" (log likelihood 100). This token also has an item for the "Top log likelihood" having the value "140" and the three entries just listed have the relative values of "0", "−20" and "−40" respectively.

For the transition to state 5 there is no new word added to the token (although this is a possibility), but the two tokens are merged so that at time t there is a single token at state 5. The entry corresponding to "open the" now has a higher log likelihood (160) due to transition log likelihood and the emission of state 5. The relative difference of the log likelihood of all other entries doesn't change when tokens are passed without merging, but need to be adjusted when two tokens are merged (as shown in this example).

Due to the limit on the number of entries in the token, namely three, a selection has been made. The entries "open new" and "close the" have been selected as they have the highest scores (150 and 140 respectively). The other entries have been dropped as their log likelihood is too low. The limit on the number of entries in a token does not compromise the correct functioning of the ASR system, but it does limit the number of alternative hypothesis that can be correctly reconstructed from any token (and hence from the complete recognition process).

Therefore, in summary, this known merging process requires the following steps:
1. Establish space for storing the new token making sure the correct state number is stored or is implicit from the token.
2. Calculate emission and transition log likelihood for new state and add to top log likelihood.
3. Select entries for new token. These should be either from the best of the existing tokens, in which case the offset doesn't change, or from any other token in which case the offset should be adjusted to be an offset to the new highest log likelihood.
4. For efficiency reasons, it is normal to make sure the entries of the new token are in sorted order.

The last two of these steps are relatively time consuming, which represents a large part of the processing requirements of an ASR system.

An embodiment of the invention is utilised by the decoder of FIG. 1. This embodiment is described in relation to a token passing Viterbi algorithm for determining the probability of various interconnected sub-words generating the observed sequence of feature vectors.

Figure 10:
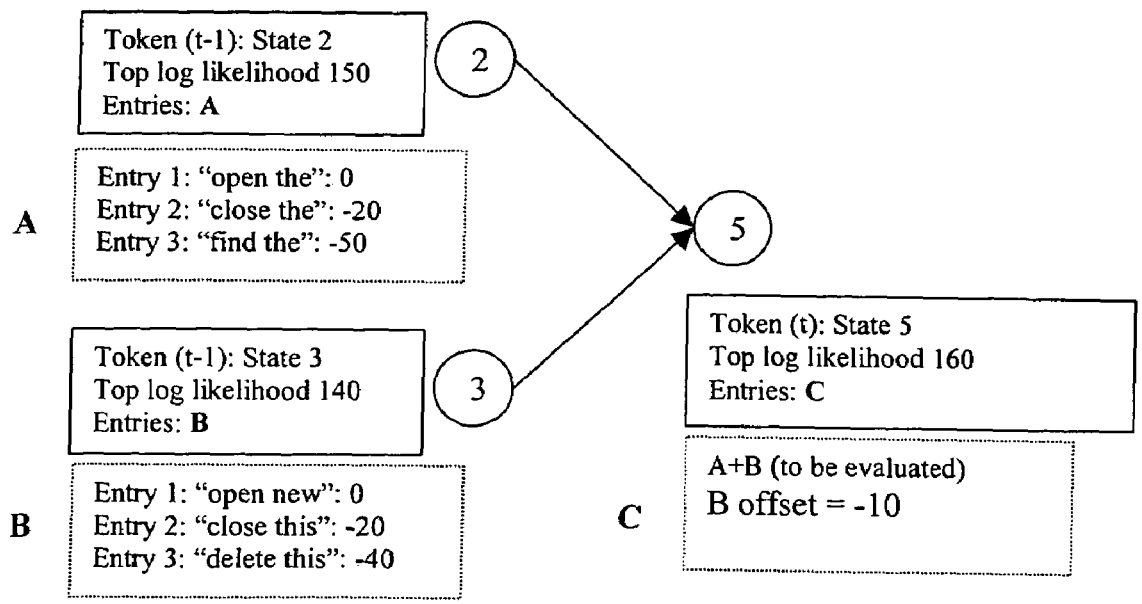
FIG. 10 illustrates a token delayed-merging or combining procedure in accordance with an embodiment.

In particular, the merge operations are "delayed" (or in many cases avoided altogether) as illustrated in FIG. 10. To allow convenient implementation of delayed merge, instead of storing the list of word histories ("open", "open the" . . . ) or their pointers (Word Hist.1, Word Hist.2 . . . ) inside the token the list is stored separately in a logically independent LIST data structure, and a token has a word history structure reference to the appropriate word history structure ("A", "B" and "C") in the LIST data structure. The list of entries or word history structures can contain either an actual list (A, B) analogous to that contained in known tokens or an list of identifiers (C) to other lists that still need to be merged. The operation still has to be carried out when the need arises (such as when the token arrives at the end of the network), but if the new token is discarded at some later time due to pruning the merger operation can be avoided. The new token retains the difference in log likelihood of the two entry lists of the delay-merged or combined tokens to evaluate them correctly at a later stage.

Comparing the tokens in FIG. 10 with those in FIG. 9, it can be seen that the difference between the tokens at states 2 and 3 is that in the approach of the present embodiment (FIG. 10), the lists are separate from the tokens (i.e. lists A and B) and the tokens have references to those lists. That is, the token of state 2 has a reference or pointer to list "A" as its entries, and the token of state 3 has a reference to list "B" as its entries. This separation is part of the preferred embodiment, although delayed merging can also be realised without this separation.

In FIG. 10, at state 5, rather than merging the tokens from states 2 and 3, as occurred in FIG. 9, minimal calculations actually take place. The token determines the top likelihood and calculates the new likelihood using the emission and transition likelihoods. This new value, being 160 in this case, is stored. It also has a reference to a list "C". List C stores enough information to undertake the merge operation between the lists from the tokens. In this instant, List C stores references to the lists to be merged at a later date, being Lists A and B, as well as the difference between the likelihoods of the two lists, being −10.

One advantage of this method is that the merge operation is not carried out for tokens that are later pruned because their likelihood score is too low. This results in lower usage of CPU.

Figure 11:
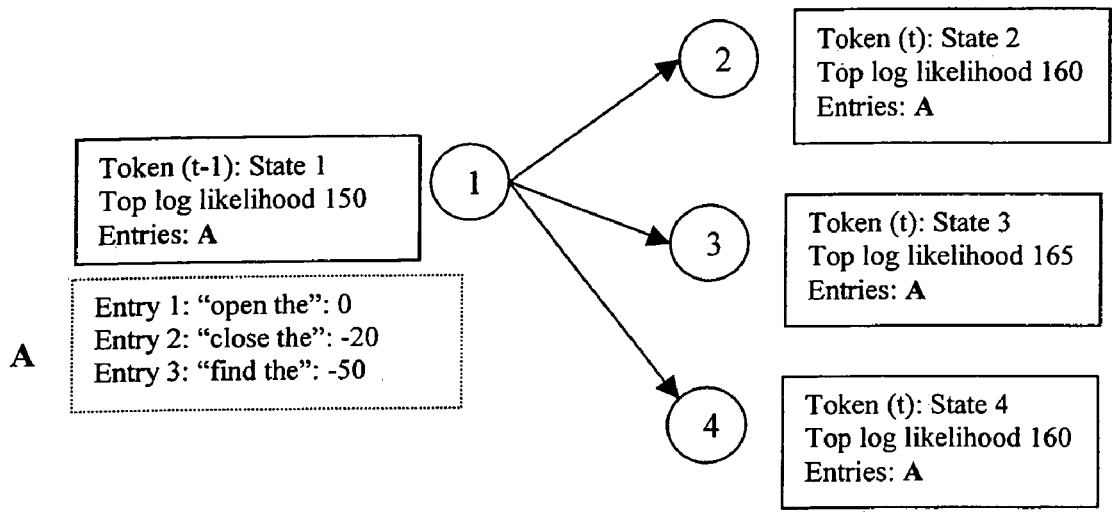
FIG. 11 illustrates an example of sharing of entry lists which can arise from using the token structure according to an embodiment.

A further advantage of the embodiment where the lists are not stored inside the token, is a saving in memory usage, since a number of tokens can share the same structure even though the data structure that contains the entries may be large. This is illustrated in FIG. 11.

A token at state 1, has a reference to a list A as well as a top likelihood reference, being 150. This token is then sent to a number of different states, being states 2, 3, and 4. At these states, no other tokens are received, so it is only the likelihood that needs to be updated in each case, using the emission and transition likelihoods for each new state. Therefore the new tokens at states 2, 3 and 4 all have new top likelihood values, being 160, 165 and 160 respectively, but still refer to the list A. Therefore, new lists need not be formed for these tokens; instead they share the existing structure of list A. While there is an overhead in having indirect references to the lists, there is generally a saving due to this sharing of structures.

Figure 12:
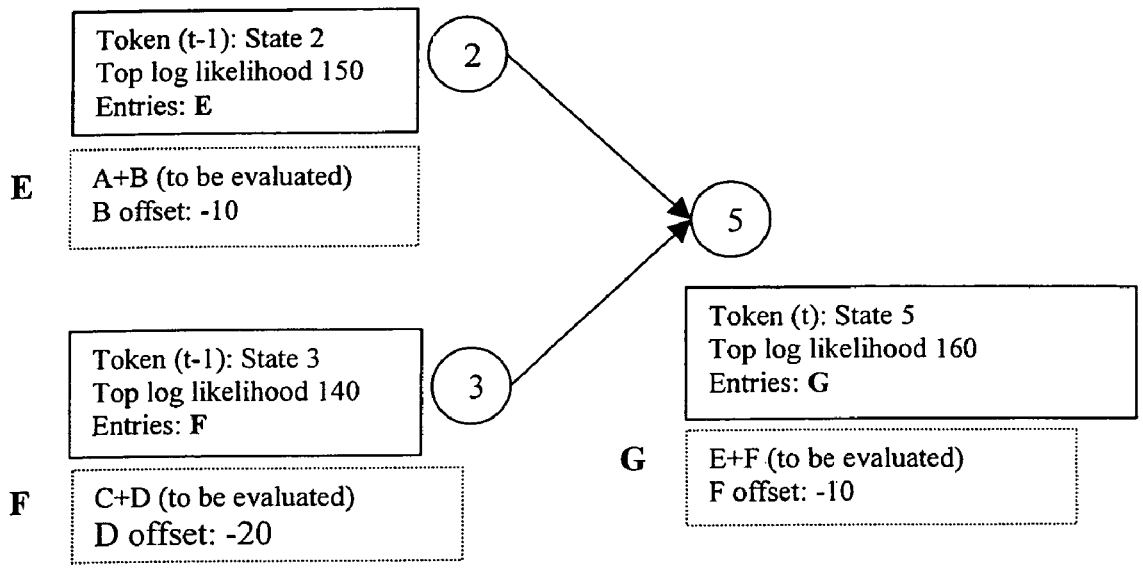
FIG. 12 illustrates an example of a multiply-delayed token according to an embodiment.

An embodiment is illustrated in FIG. 12 showing the usage of multiple delayed merge operations. The token at time t refers back to lists that belonged to tokens at time t−1, which in turn refer back to older lists.

More specifically, at time t, the token is at state 5. At this state, two tokens have arrived, one from state 2 and the other from state 3. As with the previous embodiment, the token at state 5 determines the new top log likelihood for the tokens arriving from states 2 and 3 and stores the best one, which in this case is the value 160. It then stores a reference to a new list, G. The new list G stores references to the two lists associated with the tokens at states 2 and 3, being lists E and F. The new list also stores the difference between the two top likelihoods of the entries in lists E and F from states 2 and 3 respectively. This is stored as "F offset: −10".

Referring to lists E and F associated with the tokens of states 2 and 3 respectively, it can be seen that these lists also contain information sufficient to undertake a merge operation at a later time. That is, the list associated with state 2, refers to two earlier lists, A and B, and stores the value "−10" as the amount the top likelihood from List B is offset from list A. Similarly, the list F associated with state 3 refers to two earlier lists C and D, and stores the value "−20" as the List D offset.

Therefore, the token structure, with its reference to a separate memory location with information about tokens in previous states, has the additional advantage of also allowing multiple merge operations to be delayed until a later point in time. It follows that there is more chance that the token will be pruned, avoiding the (multiple) merge operation.

Figure 13:
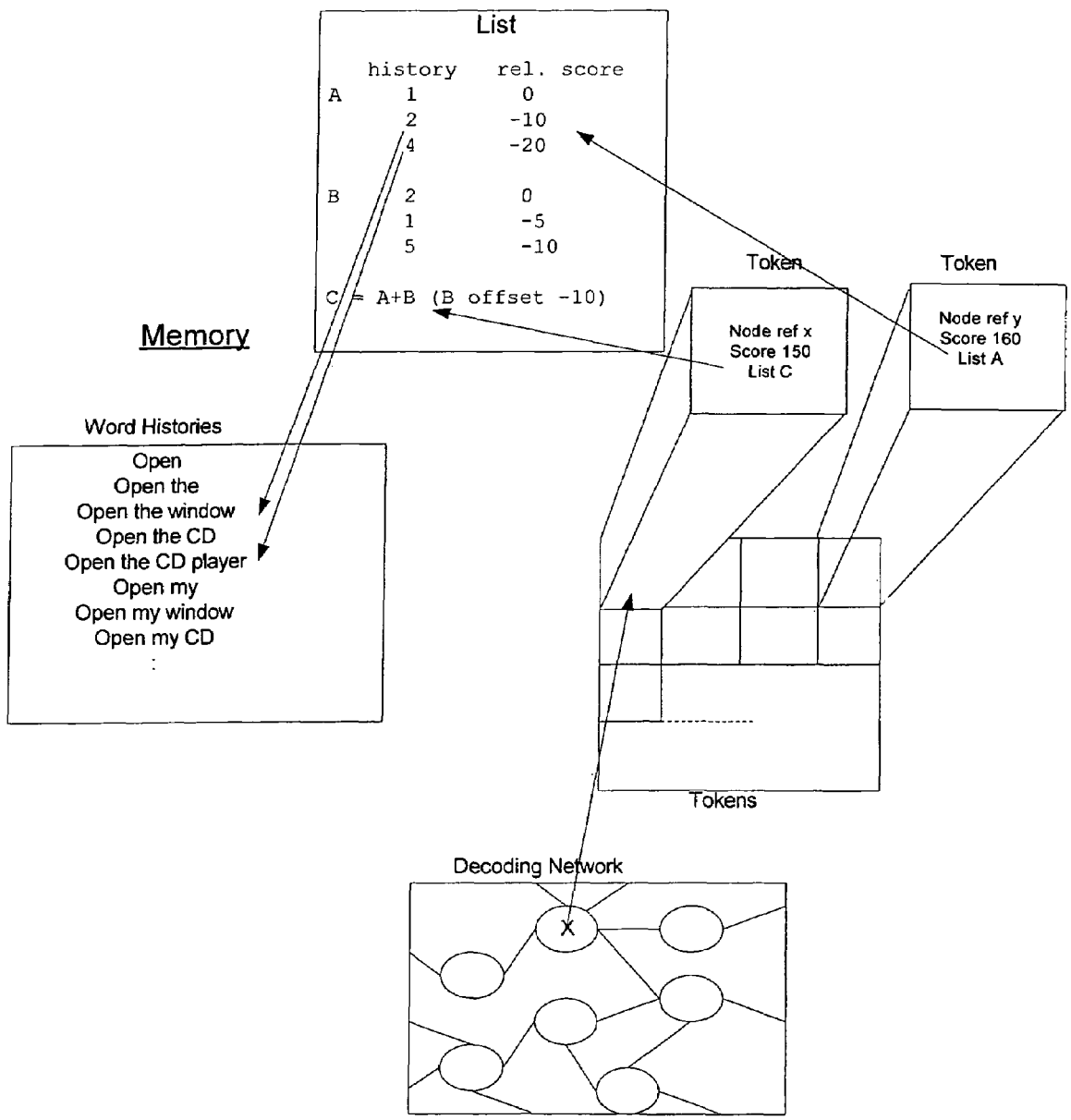
FIG. 13 illustrates a memory architecture for storing the data structures of an embodiment.

Referring now to FIG. 13, a memory architecture illustrating the embodiment is shown. In an analogous manner to that shown in FIG. 5, a node X in the decoding network has an associated token x which comprises a node reference and a likelihood score for that node X. However instead of a list of word histories ("open", "open the " . . . ) or corresponding pointers (Word Hist.1, Word Hist.2 . . . ), the token x contains a pointer or index (List C) to word history structures (A, B, C) in a LIST data structure. The word history structures (A, B, C) comprises pointers (Word Hist.1, Word Hist.2 . . . ) to the corresponding word histories ("open", "open the" . . . ) together with their associated with offsets.

In addition to list entries (A and B) containing word history pointers (Word Hist.1 . . . ) or indeed in some implementations the word histories themselves ("open" . . . ), the LIST data structure also comprises list entries (C) containing pointers or references to other lists in the LIST data structure (eg C=A+B). By utilising these pointers, the merge operations normally required can be delayed, for example until the word histories need to be extended with a new word. Thus the computationally expensive exercise of comparing the word histories in each of the tokens A and B and recalculating the likelihood scores (or offsets) is delayed.

Figure 14:
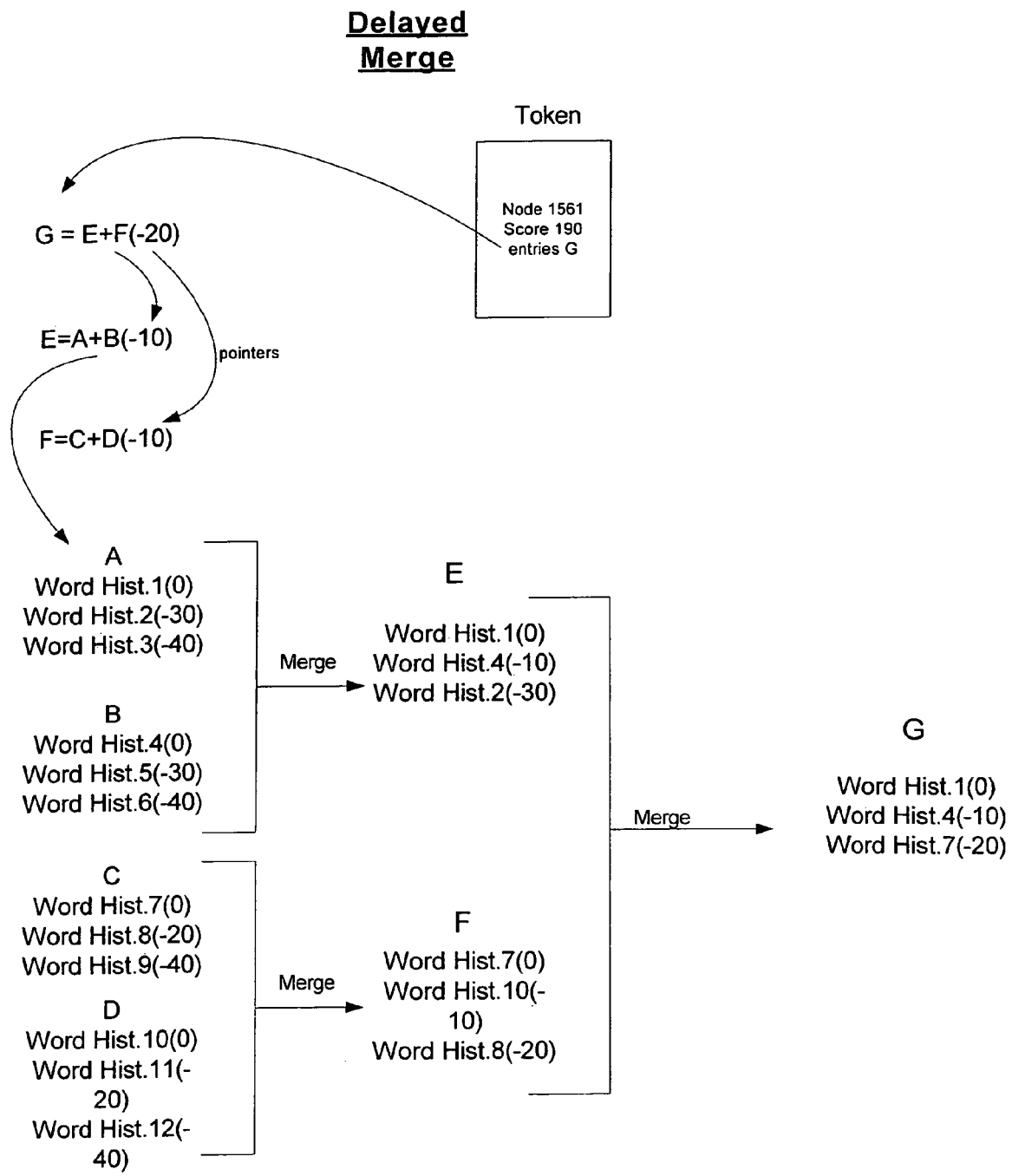
FIG. 14 illustrates a delayed merge operations of an embodiment.

FIG. 14 illustrates the merging process when delayed. The delayed merge operation may be executed when the word histories of a token need to extended. Also, when the processing of new feature vectors is terminated, for example because one token has reached the end and is judged plausible, or because there are no further vectors available or a time limit imposed by the application has been reached, the delayed merge operation is executed for that one token if required. In this example, a token corresponding to node 1561 in the decoding network has a log likelihood score of 190, and is associated with a word history structure G. The word history structure G indicates it should be formed by combining two different word history structures, namely E and F, where F should receive an extra penalty of −20. The structure E, in turn, indicates it should be formed by combining A and B, giving B a penalty of −10. The structure F indicates that it should be formed from C and D, where D receives a penalty of −10 on top of the penalty that F already receives.

The figure shows how A and B are combined to form list E, which contains two entries from A (word histories 1 and 2) and one entry from B (word history 4). It also shows how list F is formed from lists C and D, receiving two elements from A (word histories 7 and 8) and one from list B (word history 10).

Once this has been done it is possible to construct list G, which receives two entries from list E (word histories 1 and 4) and one from list F (word history 7). This gives the n-best answer for n=3, as the top three hypothesis are approximated by taking these three word histories and their log likelihoods. Other approximations are also possible.

FLOWCHART A and B illustrate the general working of a speech recognition system that uses delayed token merging according to an embodiment of the invention. These use the concept of a 'node', which usually corresponds to a state. (For instance, several nodes may correspond to the same state if some HMM structure is repeated at different places in the network. In that case every node has distinct tokens.) The flowcharts illustrate how the tokens in the network are passed (ie copied or delay-merged) through the network, being split (i.e., one token being forwarded to several nodes) and delay-merged (i.e., multiple tokens coming together at one nodes, with merge operation delayed), until the end of the network is reached.

The system underlying the flowcharts uses the following elements:
1. A representation of the network structure, which contains nodes (reflecting an expected observation) and arcs between the nodes which decide permissible paths. These arcs can also carry a word label, which should be added to the word history of tokens that traverse it.
2. A set of tokens valid at the previous time index, which carry information about the node where they are, their top likelihood, and an index to their list of entries.
3. A set of tokens constructed for the current time index, which carry the same information as the previous tokens.
4. A set of lists of entries to which the tokens refer. Every list can be either a normal list (containing pairs of word history and log likelihood offset), or a delayed list, in which case they generally contain two or more indices to other entry lists (normal or delayed) and a log likelihood offset for the lower scoring of the two.

Figure 15:
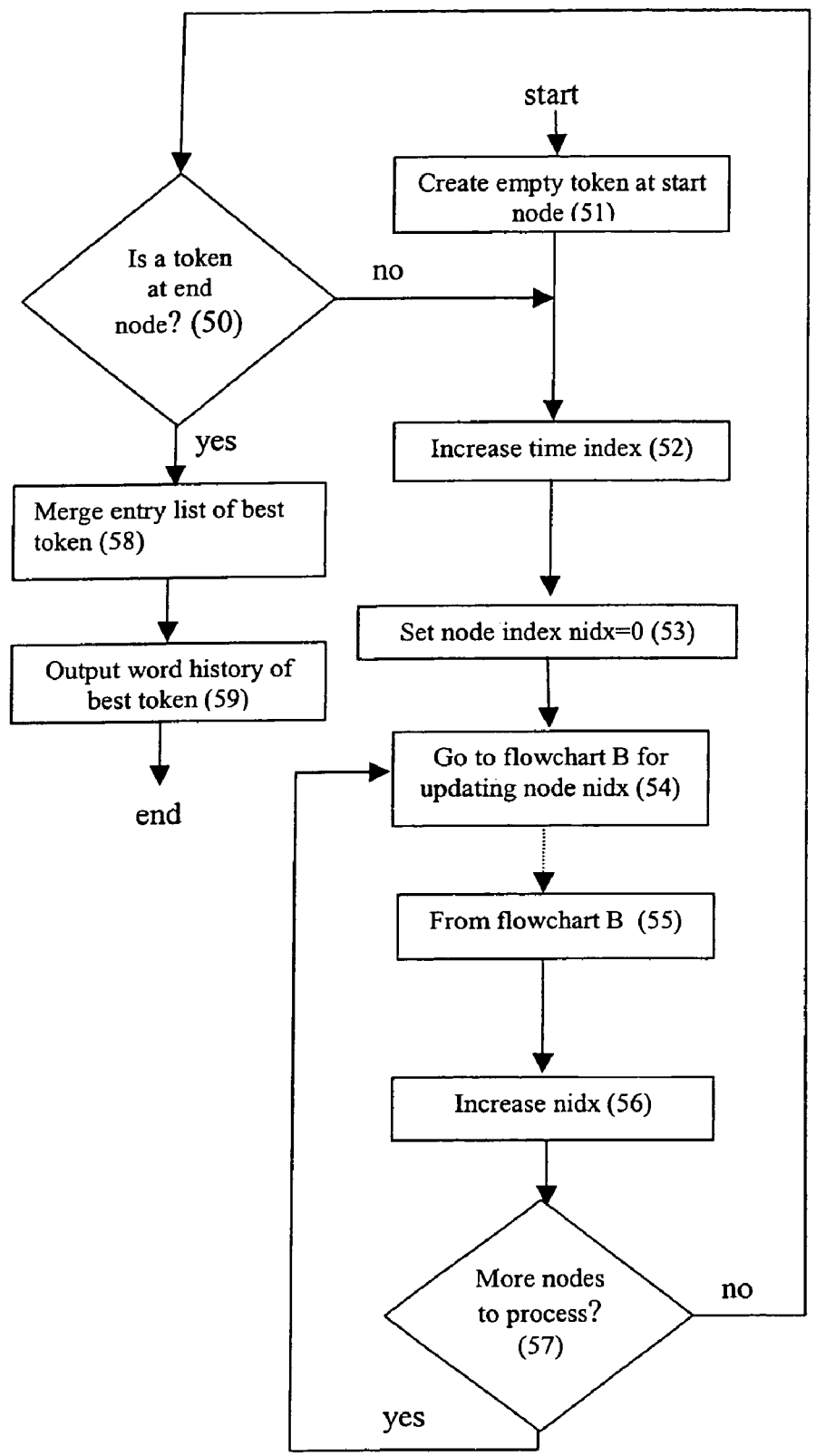
FIGS. 15 and 16 show FLOWCHARTS A and B respectively, which illustrate the general working of a speech recognition system which uses delayed token merging according to an embodiment of the invention.

Referring first to FLOWCHART A in FIG. 15, an initial empty token is created at an initial node (51). The system then goes into a loop in which it increases the time index (52), and evaluates all nodes (53-57) by collecting information from the tokens that were created for the previous time index.

More specifically, this is done in a node-by-node fashion, initialising a parameter, nidx, which is an index to the nodes (53) and executing the node update procedure described in FLOWCHART B (54)—this will be described in more detail shortly. The index is then incremented (56), and the evaluation procedure is repeated until all nodes have been processed (57). At this point the system checks if some token has reached the end of the network (50). If this is not the case it continues with the next time index. If some token is at the end, the system executes any delayed merge (58) on that token and outputs the best word history (59). It is to be appreciated that more sophisticated mechanisms are possible for termination, and that this is just one example thereof.

Figure 16:
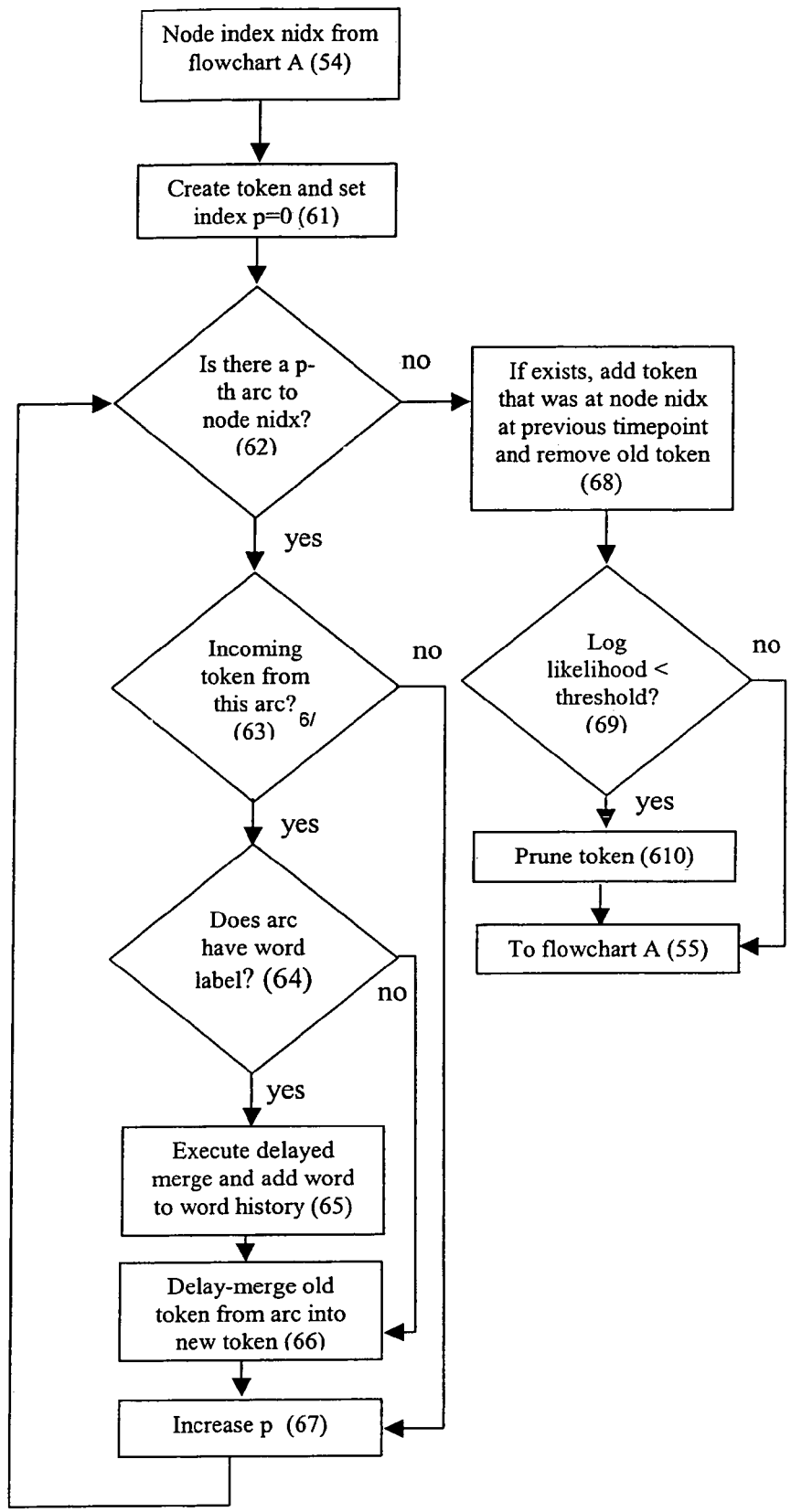

Referring to FLOWCHART B in FIG. 16, the evaluation of a single node is done by traversing through all incoming arcs (61-66) and combining these, making a delayed entry list structure.

More specifically, first a token is created and a parameter, p, which is used to index all incoming arcs of the node is initialised (61). Each of the arcs is processed (62). If an arc comes from a node that has no token, it can be ignored (63). If the arc has a word label (64), the word histories in the token from that node are updated. When coming across a word label, it is possible to update the word-history for every entry that is referred to in the delayed entry list structure, but in the preferred embodiment the delayed merge is executed before extending word histories (65).

Then, regardless of whether or not a word label was encountered, the token from the previous time frame is delay-merged into the new token (66). Finally the arc index is increased (67) and the loop is repeated. When all incoming arcs have been handled, the token that was at this node at the previous time index (68) should also be delay-merged into the new node, reflecting the self-loop on the HMM structure. Using the beam-pruning strategy that was described earlier, the new token is pruned if it is lower than the threshold (69-70). In this case it is assumed that the best likelihood of the previous time index is used.

A delayed merge procedure (66) is described with reference to FIG. 17. Tokens from states 1, 2 and 3 corresponding to time t−1, arrive at state 4 at time t. The token from state 1 refers to list A and has a top log likelihood of 150, the token from state 2 refers to list B and has a top log likelihood of 130 and the token from state 3 refers to list C and has a top log likelihood of 160.

The operation of creating a delayed merged token, according to an embodiment of the invention, is as follows:

1. When adding the first token from the previous time index, set node index and log likelihood (old log likelihood updated with transition and emission log likelihood for this node). Simply keep reference to entry list.
2. When processing another token from the previous time index, create a temporary structure which contains a reference to two entry lists, and make this the new entry list of the new token. Also check if the score (before updating) is higher than the first. If it is, change the log likelihood of the new token and give the index of the entry list of this token with offset 0. Change the offset of the other entry list to reflect the difference in log likelihood. If the log likelihood is lower, set the offset that reflects the difference in log likelihood and set the other offset to 0.

Figure 17:
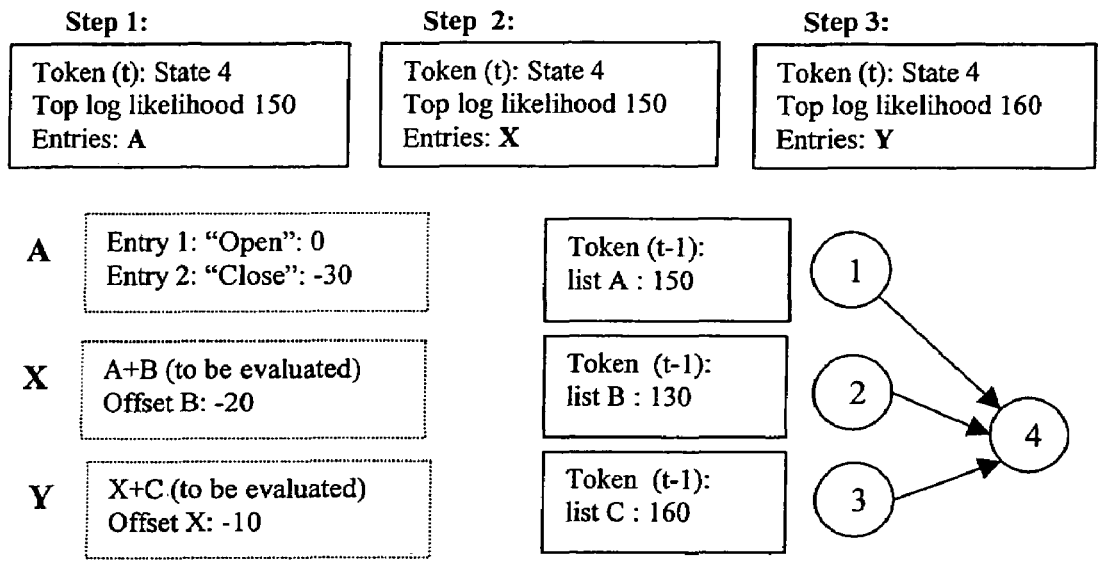
FIG. 17 illustrates the operation of creating a delayed merged token according to an embodiment.

This operation is indicated in the FIG. 17 example. "Step 1" is exemplified, whereby the new token at state 4 is given the top log likelihood from the node 1 token, being 150, and is also given the list reference for the node 1 token, being list A.

"Step 2" is then exemplified, whereby the node 2 token is taken into consideration. The top log likelihood for the new token at state 4 stays at 150, as the value for the node 2 token is less (i.e. 130). A new entry list reference X is given to the new token. Referring to the list X, it can be seen that this contains delayed merge information, that is information sufficient for undertaking a merge operation at a later date. List X identifies the lists for the node 1 and 2 tokens, being lists A and B, as well as the amount the top log likelihood in list B is offset from that of node A, being −20.

Since the example in FIG. 17 has three tokens arriving at state 4, "Step 2" is repeated for the third token and is exemplified in the Figure as "Step 3". Here, the new token is given the log likelihood 160, which corresponds to that for the node 3 token, being the largest of the log likelihoods. A new entry list reference Y is given to the new token. Referring to the list Y, it can be seen that this contains delayed merge information, which is sufficient for undertaking a merge operation at a later date. List Y identifies the list for the node 3 token, being list C, as well as list X, which is the list created for the delayed merger of the lists for the tokens from nodes 1 and 2. List Y also contains the amount the top log likelihood in list C is offset from that of list X, being −10.

In general, the merge operation, when this is required after being delayed for some time, is as follows:

1. Check if any of the two lists that the entry list refers two are delayed themselves. If this is the case, recursively merge them first.
2. Merge the two (non-delayed) lists in the normal way, as described earlier for a normal system, as is usual practice in the prior art.
3. Give the resulting entry list the same index, so that any other token that referred to it now automatically refers to the merged version.
4. Remove the temporary structure that was used for the delay.

Figure 18:
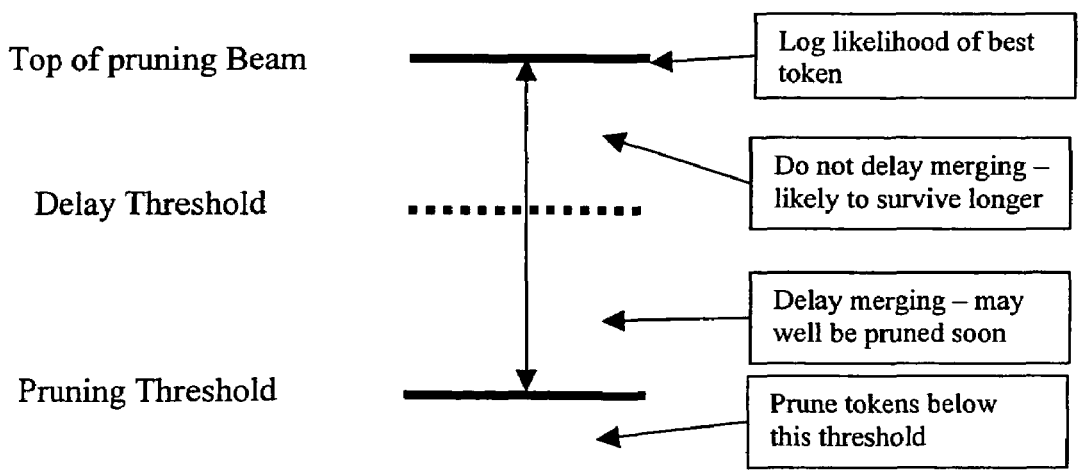
FIG. 18 illustrates a partial delayed merger approach according to an alternative embodiment of the invention.

According to an alternative embodiment of the invention, a further improvement can be made to the system by observing that delaying the merge operation is of less use if it is very likely that the merge operation will be required anyway. A good indication of this is obtained by comparing the best log likelihoods of the tokens to be merged. As illustrated in FIG. 18, if this is close to the log likelihood of the best token in the overall system, then that token is likely to survive for quite some time and delaying the merge may not be worthwhile. If however, this is closer to the lower side of the beam, then the token is quite likely to be pruned away soon, and delaying the merge may be quite useful since it is likely that the merge can be avoided completely.

Therefore, according to this alternative embodiment, when two (for example) tokens arrive at a node, a comparison between the highest log likelihood of the tokens and the highest log likelihood of all tokens is undertaken. If the highest log likelihood of the tokens that are to be merged is more than a predetermined delay threshold from the top log likelihood, then a delayed merge procedure is undertaken. If however, the highest log likelihood is within the predetermined delay threshold, the merger procedure is undertaken without delay. It is also to be appreciated that where the highest log likelihood is less than a pruning threshold (which is less than the delay threshold), then the token is pruned from the system without a merger or a delayed merger procedure being undertaken.

Experiments comparing the delayed merge approach to the standard token passing algorithm have demonstrated that it avoids around 30% of all merge operations. As merge operations account for around 50% of CPU usage, this corresponds to a saving of around 15% on the total CPU usage. A lower CPU consumption translates into a cheaper device or faster feedback to the user.

Whilst the above embodiments have been described with respect to determining the N-best word histories, alternative arrangements in which multiple word histories determined, and hence multiple word histories are associated with each token. An example is where it is desirable to determine a best result in a number of categories. Further embodiments are described with respect to FIGS. 19 to 22 in which utilisation is made of multiple categories.

There can be many reasons for wanting to categorise possible word histories, for example, the decoder may indicate to the application what the most likely utterance is if a certain level of noise is assumed, what the most likely utterance is if a certain topic is assumed, or what the most likely utterance is if a particular sound was uttered just before or after this sound fragment (affecting the pronunciation of this segment).

Figure 19:
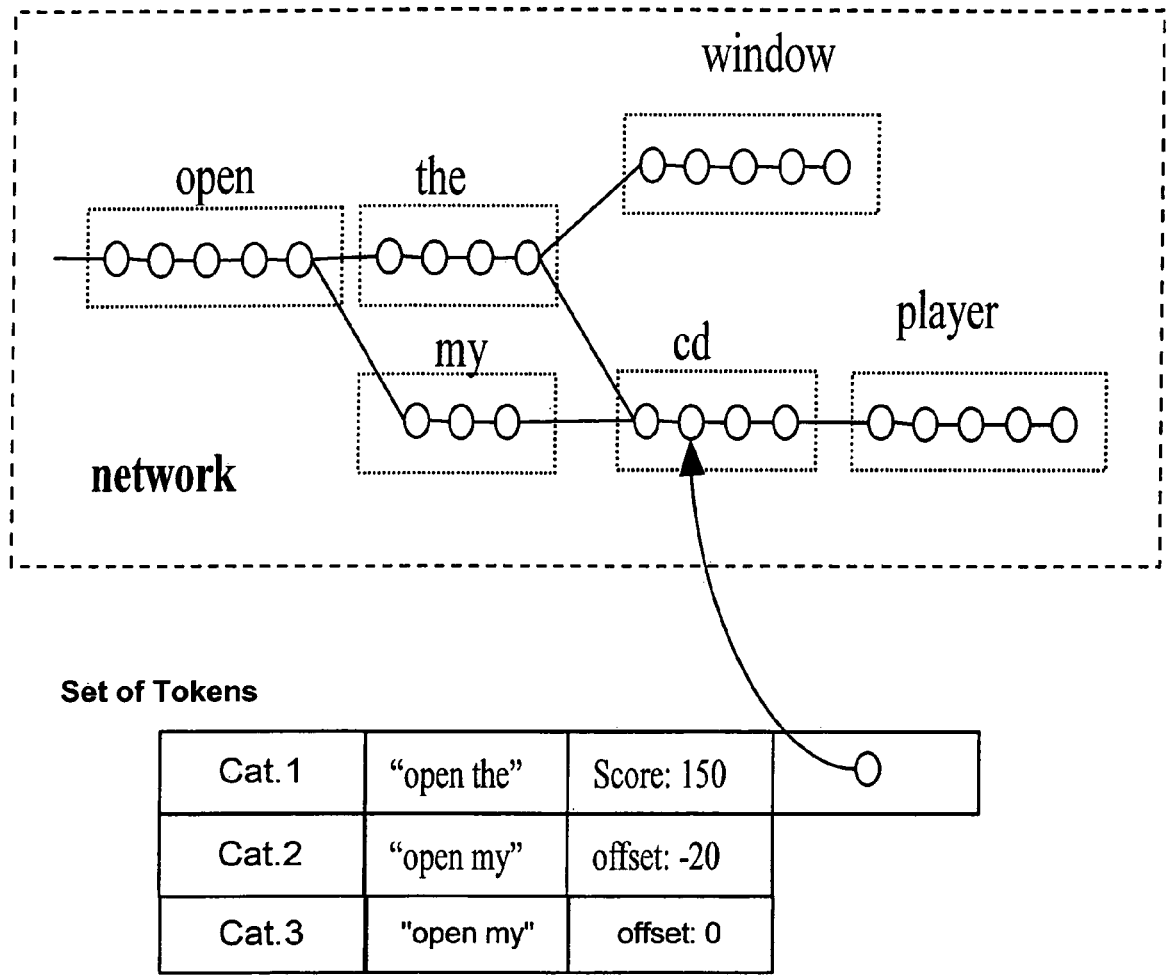
FIG. 19 illustrates a token associated with a node of a decoding network, in another embodiment in which a category is associated with each word history.

As shown in FIG. 19, a category marker is associated with every word history in each token, that represents some aspect of the context of the utterance. There can for example be a set of categories that represents sounds made just before or after the sound segment, a set of categories that represents noise conditions in the environment, or a set of categories that reflects dialogue level information, such as the topic the user is referring to. The acoustic model or the language model are then free to adjust scores of word histories based on this. For example, the acoustic model may adjust the likelihood of the first sound based on the information about the previous sound implied in some category.

As before, the tokens are typically configured to have an associated top score (150) and offsets from this, for example whilst category 1 and 2 both have the same word history, there is a difference in their likelihood.

Figure 20:
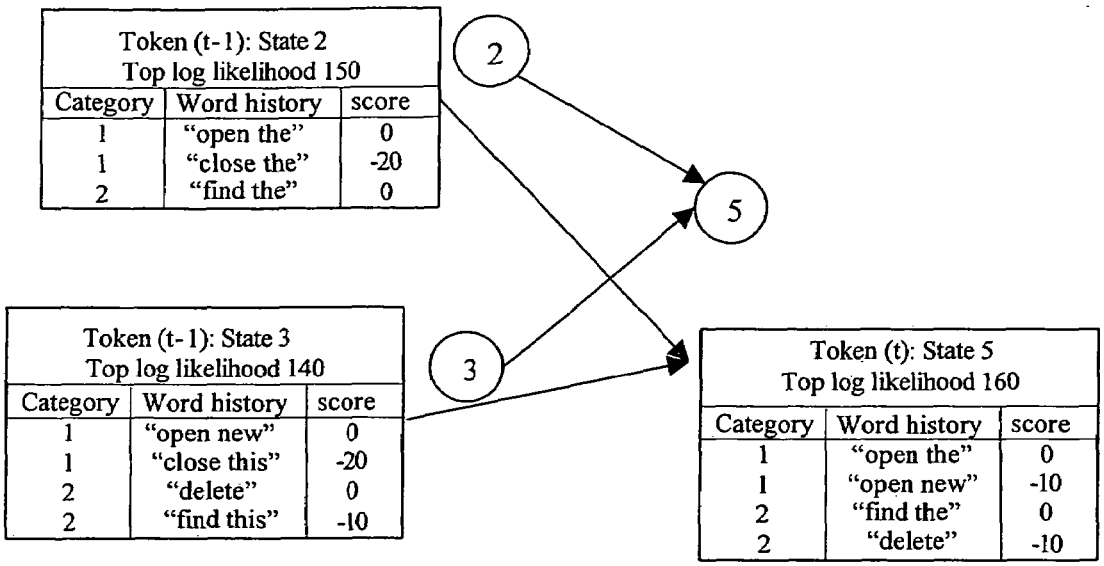
FIG. 20 illustrates a token merging procedure utilising categorisation.

FIG. 20 shows an N-best category based arrangement in which the aim is to determine the N-best word histories in each category. In the standard method, the merging of tokens for states 2 and 3 to a new token for state 5 requires determining the N-best (in this example the two best) word histories for each category. The difference here from the operation shown in FIG. 9 is that only word histories with the same category identifiers are considered for merging. Thus word histories for different categories are kept separate.

As shown, the token for state 2 has only one category 2 word history, whereas the token for state 3 has two category 2 word histories. This may occur because word histories that are very unlikely are discarded.

Figure 21:
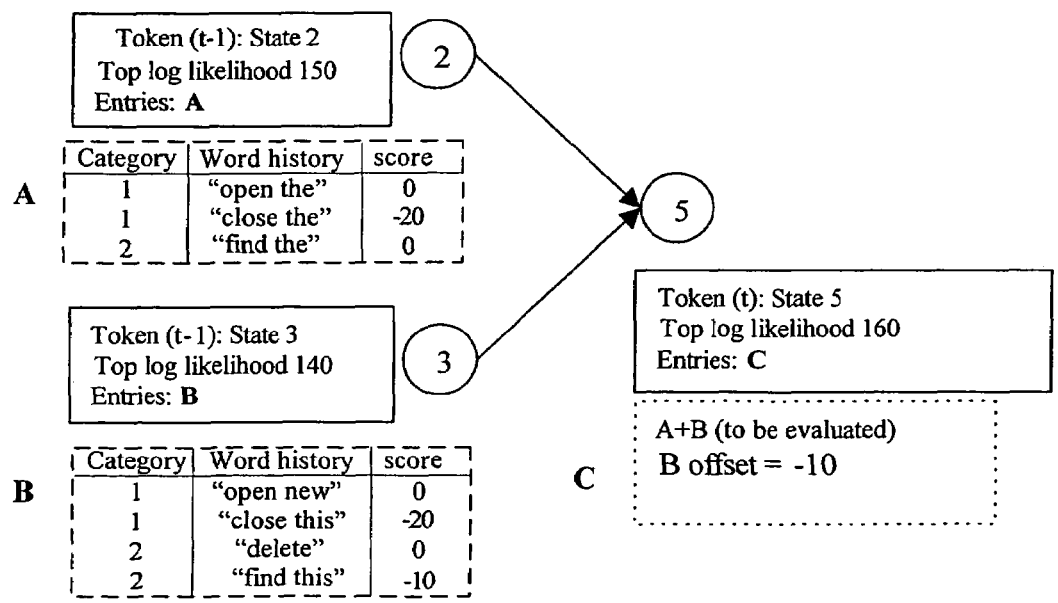
FIG. 21 illustrates a category-based token delayed-merging or combining procedure in accordance with an embodiment.
Figure 22:
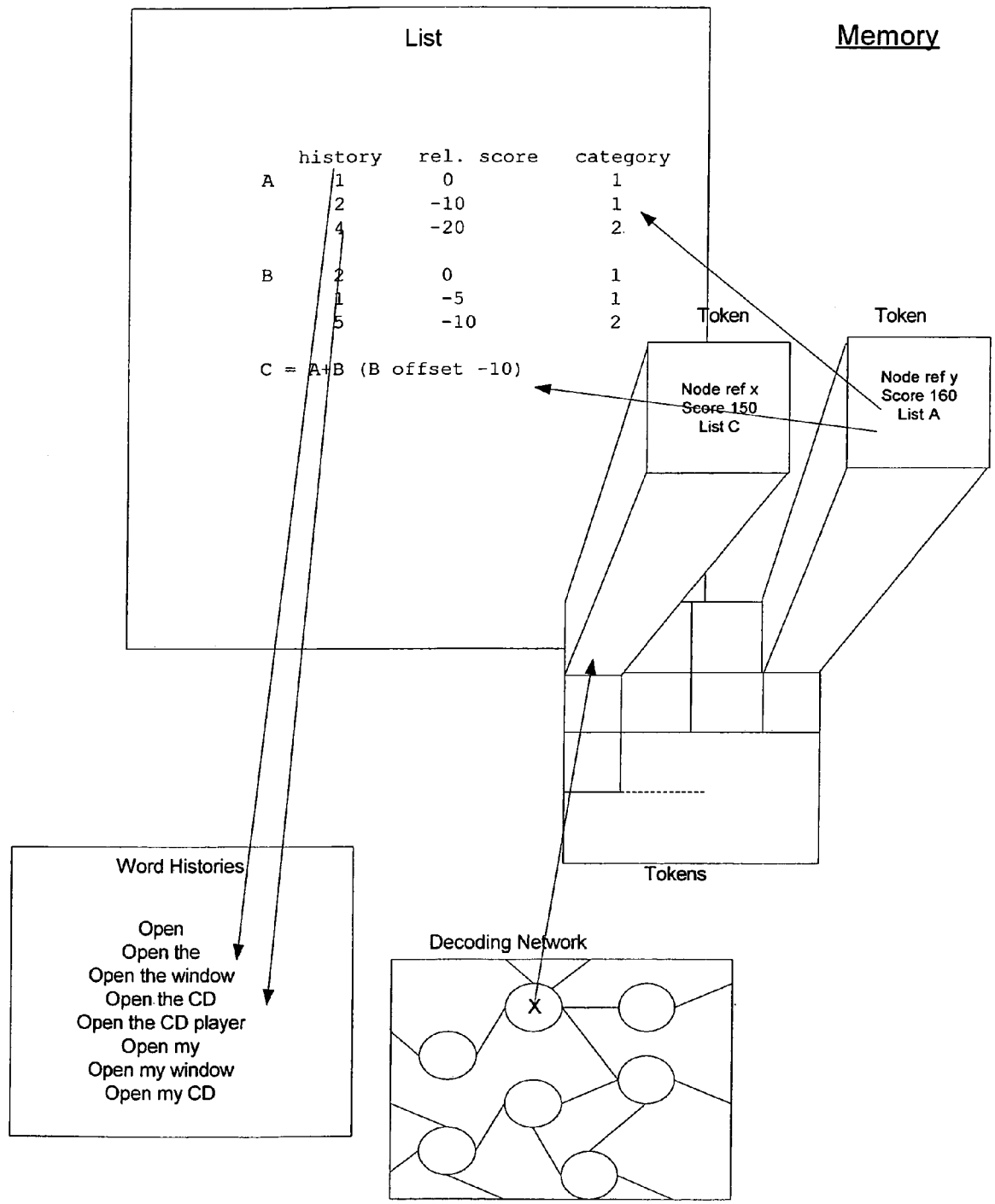
FIG. 22 illustrates a memory architecture for storing the data structures of an embodiment.

In a manner analogous to the delayed merge operation illustrated in FIG. 10 without categorisation, the merging of tokens associated with states 2 and 3 (and their associated word history Lists A and B) is illustrated in FIG. 21. The merge is delayed by creating a token for state 5 which uses a pointer C to an entry in a LIST database. This entry C merely identifies the word histories A and B of the contributing tokens from states 2 and 3 which may eventually need merging. The additional factor in dealing with categorisation is to differentiate the pointers associates with each category, for example as shown in FIG. 22 by including a category field in a LIST table for each word history pointer for example. This ensures that only word histories in the same category are considered as the or one of the N-best word history for that category.

Figure 23:
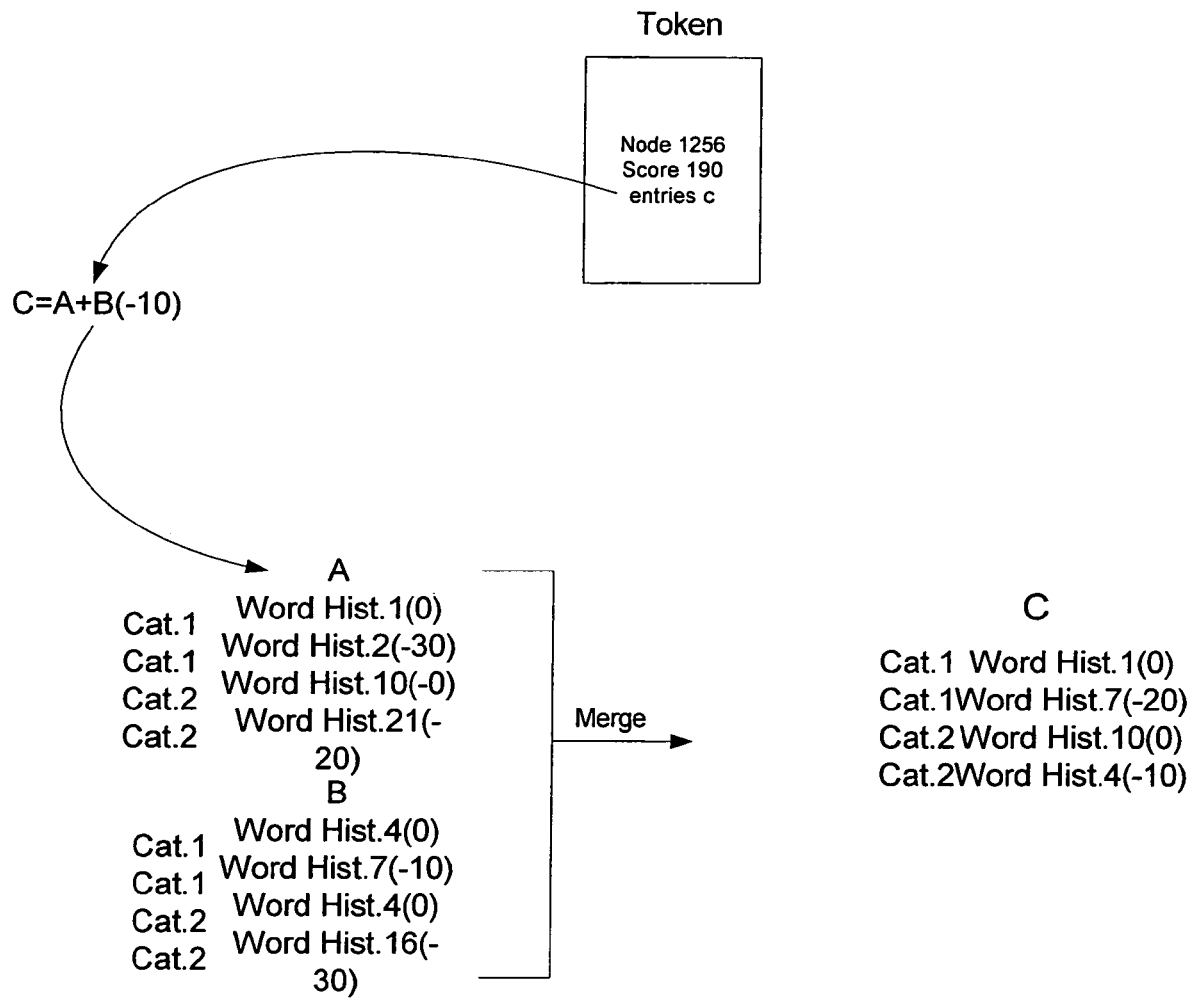
FIG. 23 illustrates a delayed merge operations of an embodiment.

An illustration of a delayed merge analogous to FIG. 14 is shown in FIG. 23 in which categorisation is allowed for. For simplicity of explanation it is assumed that the "winning" or end token has a word history pointer C which refers to other word history pointers A and B which require merging. The pointers A and B in a List database point to a number of word histories in the word history database, but are associated with different categories. Therefore the merging is done with respect to the two categories, with category 1 have its two best or most likely word histories 1 and 7, and category 2 having word histories 10 and 4 as its most likely.

The additional procedure for utilising a delayed merge method in a category based system is therefore as follows. Inside the representation of the token, add a field for a category marker for every word history. When starting to process the speech segment, one token is created at the start node but is provided with multiple word histories, each having a different category marker.

When delay-merging tokens, treat entries inside a token with the same word histories but different categories as if they had different word histories. Treat entries with the same word history and the same category as equal. When tokens are propagated, their main log likelihood is normally updated by the acoustic model, while the relative differences for other word histories in the token remain constant. When there are different categories, the acoustic model or the language model may sometimes decide to adjust the relative differences. This reflects the fact that the emission probability is sometimes different for the various categories.

When a token reaches the end of the network, a top hypothesis can be provided for every category, or in fact nbest results can be provided for every category.

Alterations and additions are possible within the general inventive concepts. The embodiments of the invention are to be considered as illustrations of the inventions and not necessarily limiting on the general inventive concepts.

For instance, for ease of understanding, the inventive concepts have been described in relation to the token passing algorithm, which is a formulation of the Viterbi algorithm. It is however to be appreciated that the inventive concept can be applied to any decoder using the Viterbi algorithm. Further, as the Viterbi algorithm is a special case of the Baum-Welch algorithm (also known as the forward-backward algorithm) it is possible to use the inventive concepts on this algorithm.

Further, it is to be appreciated that the inventive concepts have been described from the point of view of a general speech recognition system, and that in practice a more complex method may be used, such as to allow for the effects of co-articulation, to compensate for timing differences arising from different speaking rates, and to deal with differences between speakers.

In addition, it is to be appreciated that the term "word" as used throughout the specification generally denotes the basic recognition unit, which could be an actual word, a phrase of several words or a component of an actual word such as biphone or a phoneme.

Embodiments of the invention have been described with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognise that these functional building blocks can be implemented by discrete components, application specific integrated circuits, processors executing appropriate software and the like or any combination thereof.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

Any discussion of the prior art throughout the specification is not an admission that such prior art is widely known or forms part of the common general knowledge in the field.

The invention also provides any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims, abstract and drawings may be replaced by alternative features serving the same, equivalent or similar purposes, unless expressly stated otherwise.

The invention claimed is:

1. A decoder for an automatic speech recognition system for determining one or more candidate text unit concatenations according to a predetermined criterion and which correspond to a speech segment, the decoder comprising:
   a processor arranged to receive a sequence of feature vectors corresponding to the speech segment;
   the processor arranged to map with different likelihood values the feature vectors to sequences of nodes in a decoding network, every sequence representing a concatenation of text units;
   the processor arranged to determine one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;
   tokens from different nodes that are to be passed to a common node are combined to generate a new token corresponding to the common node, said new token including a pointer to a word history structure that includes
      pointers to text unit concatenations from previous tokens of different nodes, and
      offsets indicating a difference in maximum likelihood scores between the text unit concatenations from the previous tokens; and
   the processor is further configured to delay a merging of the text unit concatenations in the new token to determine the N-best likelihood values until an end of the speech segment and output the one or more candidate text unit concatenations corresponding to the speech segment.

2. A decoder according to claim 1 wherein the processor is further arranged to merge said new token, the text unit concatenations of said previous tokens being associated with said merged token dependent on their corresponding likelihood values.

3. A decoder according to claim 2 wherein said merging is only delayed if the new token has a likelihood value below a delay-merge threshold.

4. A decoder according to claim 1 wherein the processor is further arranged to prune tokens having likelihood values below a prune threshold.

5. A decoder according to claim 1 wherein the tokens are additionally associated with a number of category markers each corresponding to said text unit concatenation, each category marker being associated with one of a plurality of categories, such that the plurality of candidate text unit concatenations in a token are the text unit concatenations with the best likelihood values in said plurality of categories.

6. A decoder according to claim 5 wherein the plurality of candidate text unit concatenations are the text unit concatenations with the N-best likelihood values in each said category.

7. A decoder according to claim 1 wherein the multiple text unit concatenations associated with each token are used to allow a statistical language model score to be added to the likelihood values associated with said text unit concatenations.

8. A decoder according to claim 1 wherein the dynamic programming token passing algorithm is a Viterbi algorithm.

9. A decoder according claim 1 wherein the dynamic programming token passing algorithm is a Baum-Welch algorithm.

10. A decoder according to claim 1 wherein the tokens and the text unit concatenations are stored in logically separate memories, and wherein a logically separate list data-structure is used to associate tokens with their text unit concatenations or identifiers and corresponding likelihood values.

11. A decoder according to claim 1 wherein the processor is further arranged to map using an acoustic model based on Hidden Markov Models.

12. An automatic speech recognition system comprising a decoder for determining one or more candidate text unit concatenations according to a predetermined criterion and which correspond to a speech segment, the decoder comprising:
   a processor arranged to receive a sequence of feature vectors corresponding to the speech segment;
   the processor arranged to map with different likelihood values the feature vectors to sequences of nodes in a decoding network, every sequence representing a concatenation of text units;
   the processor arranged to determine one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;
   tokens from different nodes that are to be passed to a common node are combined to generate a new token corresponding to the common node, said new token including a pointer to a word history structure that includes
      pointers to text unit concatenations from previous tokens of different nodes, and
      offsets indicating a difference in maximum likelihood scores between the text unit concatenations from the previous tokens; and
   the processor is further configured to delay a merging of the text unit concatenations in the new token to determine the N-best likelihood values until an end of the speech segment and output the one or more candidate text unit concatenations corresponding to the speech segment.

13. A voice activated control or navigation system for in car use, the system comprising an automatic speech recognition system comprising a decoder for determining one or more candidate text unit concatenations according to a predetermined criterion and which correspond to a speech segment, the decoder comprising:
   a processor arranged to receive a sequence of feature vectors corresponding to the speech segment;

the processor arranged to map with different likelihood values the feature vectors to sequences of nodes in a decoding network, every sequence representing a concatenation of text units;

the processor arranged to determine one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;

tokens from different nodes that are to be passed to a common node are combined to generate a new token corresponding to the common node, said new token including a pointer to a word history structure that includes pointers to text unit concatenations from previous tokens of different nodes, and offsets indicating a difference in maximum likelihood scores between the text unit concatenations from the previous tokens; and the processor is further configured to delay a merging of the text unit concatenations in the new token to determine the N-best likelihood values until an end of the speech segment and output the one or more candidate text unit concatenations corresponding to the speech segment.

14. A method, performed by a processor, of decoding for determining a plurality of candidate text unit concatenations according to a predetermined criterion and corresponding to a speech segment in an automatic speech recognition system, the method comprising:

receiving, at the processor, a sequence of feature vectors corresponding to the speech segment;

mapping with different likelihood values the feature vectors to sequences of nodes in a decoding network, every sequence representing a concatenation of text units;

determining, at the processor, one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;

combining tokens from different nodes that are to be passed to a common node to generate a new token corresponding to the common node, said new token including a pointer to a word history structure that includes pointers to text unit concatenations from previous tokens of different nodes, and offsets indicating a difference in maximum likelihood scores between the text unit concatenations from the previous tokens;

delaying a merging of the text unit concatenations in the new token to determine the N-best likelihood values until an end of the speech segment; and outputting the plurality of candidate text unit concatenations corresponding to the speech segment.

15. A method according to claim 14 further comprising merging said new token, the text unit concatenations of said previous tokens being associated with said merged token dependent on their corresponding likelihood values.

16. A method according to claim 15 wherein said merging is only delayed if the new token has a likelihood value below a delay-merge threshold.

17. A method according to claim 14 further comprising pruning tokens having likelihood values below a prune threshold.

18. A method according to claim 14 wherein the tokens are additionally associated with a number of category markers each corresponding to said text unit concatenation, each category marker being associated with one of a plurality of categories, such that the plurality of candidate text unit concatenations in a token are the text unit concatenations with the best likelihood values in said plurality of categories.

19. A method according to claim 18 wherein the plurality of candidate text unit concatenations are the text unit concatenations with the N-best likelihood values in each said category.

20. A method according to claim 14 wherein the multiple text unit concatenations associated with each token are used to allow a statistical language model score to be added to the likelihood values associated with said text unit concatenations.

21. A method according to claim 14 wherein the dynamic programming token passing algorithm is a Viterbi algorithm.

22. A method according to claim 14 wherein the dynamic programming token passing algorithm is a Baum-Welch algorithm.

23. A method according to claim 14 wherein the tokens and the text unit concatenations are stored in logically separate memories, and wherein a logically separate list data-structure is used to associate tokens with their text unit concatenations or identifiers and corresponding likelihood values.

24. A method, performed by a processor, of automatically recognizing speech comprising a method of decoding for determining a plurality of candidate text unit concatenations according to a predetermined criterion and corresponding to a speech segment in an automatic speech recognition system, the method comprising:

receiving, at the processor, a sequence of feature vectors corresponding to the speech segment;

mapping with different likelihood values the feature vectors to sequences of nodes in a decoding network, every sequence representing a concatenation of text units;

determining, at the processor, one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;

combining tokens from different nodes that are to be passed to a common node to generate a new token corresponding to the common node, said new token including a pointer to a word history structure that includes pointers to text unit concatenations from previous tokens of different nodes, and offsets indicating a difference in maximum likelihood scores between the text unit concatenations from the previous tokens;

delaying a merging of the text unit concatenations in the new token to determine the N-best likelihood values until an end of the speech segment; and outputting the plurality of candidate text unit concatenations corresponding to the speech segment.

25. A computer storage medium including processor control code, which when executed by a processor performs a method of decoding for determining a plurality of candidate text unit concatenations according to a predetermined criterion and corresponding to a speech segment in an automatic speech recognition system, the method comprising:

receiving a sequence of feature vectors corresponding to the speech segment;

mapping with different likelihood values the feature vectors to sequences of nodes in a decoding network, every sequence representing a concatenation of text units;

determining one or more candidate node sequences in the decoding network corresponding to the candidate text unit concatenations by implementing a dynamic programming token passing algorithm in which each token corresponds to a node and is associated with a number of text unit concatenations and likelihood values for these concatenations, wherein the plurality of candidate text unit concatenations in a token are the text unit concatenations with N-best likelihood values;

combining tokens from different nodes that are to be passed to a common node to generate a new token corresponding to the common node, said new token including a pointer to a word history structure that includes pointers to text unit concatenations from previous tokens of different nodes, and offsets indicating a difference in maximum likelihood scores between the text unit concatenations from the previous tokens;

delaying a merging of the text unit concatenations in the new token to determine the N-best likelihood values until an end of the speech segment; and outputting the plurality of candidate text unit concatenations corresponding to the speech segment.

\* \* \* \* \*